US010029368B2

(12) United States Patent
Wolowelsky et al.

(10) Patent No.: US 10,029,368 B2
(45) Date of Patent: Jul. 24, 2018

(54) DOMESTIC ROBOTIC SYSTEM AND METHOD

(71) Applicant: F Robotics Acquisitions Ltd., Pardesia (IL)

(72) Inventors: Karni Wolowelsky, Misgav (IL); Shai Abramson, Halutz (IL)

(73) Assignee: F Robotics Acquisitions Ltd., Pardesia (IL)

( * ) Notice: Subject to any disclaimer, the term of this patent is extended or adjusted under 35 U.S.C. 154(b) by 12 days.

(21) Appl. No.: 14/935,935

(22) Filed: Nov. 9, 2015

(65) Prior Publication Data

US 2016/0129593 A1    May 12, 2016

(30) Foreign Application Priority Data

Nov. 7, 2014   (GB) .................................... 1419883.2
Mar. 25, 2015  (GB) .................................... 1505078.4

(51) Int. Cl.
   *G06F 19/00*      (2018.01)
   *B25J 9/16*       (2006.01)
   (Continued)

(52) U.S. Cl.
   CPC ............... *B25J 9/1666* (2013.01); *B25J 5/00* (2013.01); *B25J 9/0003* (2013.01); *B25J 9/163* (2013.01);
   (Continued)

(58) Field of Classification Search
   CPC . B25J 9/1666; B25J 5/00; B25J 9/0008; B25J 9/163; B25J 9/1964; G05D 1/0221;
   (Continued)

(56) References Cited

U.S. PATENT DOCUMENTS 4,694,639 A   9/1987   Chen et al.
4,878,003 A   10/1989  Knepper
(Continued)

FOREIGN PATENT DOCUMENTS

DE   102012221572 A1   5/2014
DE   102013202075 A1   8/2014
(Continued)

OTHER PUBLICATIONS

Yang, Junho, et al: "Vision-Based Localization and Mapping for an Autonomous Mower", International Conference on Intelligent Robots and Systems, IEEE/RSJ pp. 3655-3662. Nov. 3-7, 2013, Tokyo, Japan.

*Primary Examiner* — Ronnie Mancho
(74) *Attorney, Agent, or Firm* — Wegman, Hessler & Vanderburg

(57) ABSTRACT

A domestic robotic system including a robot having a payload for carrying out a domestic task within a working area. The robot also includes a plurality of sensors, including one or more local environment sensors that are configured to receive signals from exterior sources local to the robot. The system further includes data storage, which is operable to store boundary information that defines the path of a predetermined boundary within which the robot is permitted to move. The robot is programmed to operate in at a reference trail recording mode and a navigation mode. In the reference trail recording mode, the robot moves along a reference trail while receiving sensor information from its sensors, with the path of the reference trail being calculated by the system based on the stored boundary information so as to be spaced apart from the path of the predetermined boundary. Also in the reference trail recording mode, the system stores reference trail information corresponding to a first plurality of points along the reference trail. This reference trail information is derived from the sensor information corresponding (Continued)

to the first plurality of points. In the navigation mode, the robot moves within the working area and navigates by: receiving current sensor information from its sensors; and, when it is in the vicinity of the reference trail, comparing the current sensor information with the reference trail information in order to determine its current position.

25 Claims, 11 Drawing Sheets

(51) Int. Cl.
  *G05D 1/02* (2006.01)
  *B25J 5/00* (2006.01)
  *B25J 9/00* (2006.01)

(52) U.S. Cl.
  CPC .......... *B25J 9/1694* (2013.01); *G05D 1/0221* (2013.01); *G05D 1/0274* (2013.01); *G05D 2201/0203* (2013.01); *G05D 2201/0208* (2013.01); *G05D 2201/0215* (2013.01); *Y10S 901/01* (2013.01)

(58) Field of Classification Search
  CPC ......... G05D 1/0274; G05D 2201/0203; G05D 2201/0208; G05D 2201/0215; Y10S 901/01
  USPC .................................................. 700/245, 253
  See application file for complete search history.

(56) References Cited

U.S. PATENT DOCUMENTS

| | | | |
|---|---|---|---|
| 5,107,946 A | 4/1992 | Kamimura et al. | |
| 5,204,814 A | 4/1993 | Noonan et al. | |
| 5,974,347 A | 10/1999 | Nelson | |
| 5,995,884 A * | 11/1999 | Allen | G05D 1/0225 180/167 |
| 6,255,793 B1 | 7/2001 | Peless et al. | |
| 6,338,013 B1 | 1/2002 | Ruffner | |
| 8,275,506 B1 | 9/2012 | Bishel | |
| 8,521,352 B1 | 8/2013 | Ferguson et al. | |
| 8,949,016 B1 | 2/2015 | Ferguson et al. | |
| 2002/0156556 A1* | 10/2002 | Ruffner | A01B 69/008 701/23 |
| 2004/0111196 A1 | 6/2004 | Dean | |
| 2004/0133316 A1 | 7/2004 | Dean | |
| 2005/0085947 A1* | 4/2005 | Aldred | G05D 1/0242 700/253 |
| 2007/0198159 A1 | 8/2007 | Durkos et al. | |
| 2010/0063954 A1 | 3/2010 | Anderson | |
| 2012/0101679 A1 | 4/2012 | Anderson et al. | |
| 2012/0265391 A1 | 10/2012 | Letsky | |
| 2012/0290165 A1 | 11/2012 | Ouyang | |
| 2013/0006419 A1 | 1/2013 | Bergström et al. | |
| 2013/0024025 A1 | 1/2013 | Hsu | |
| 2013/0041526 A1 | 2/2013 | Ouyang | |
| 2013/0238130 A1 | 9/2013 | Dorschel | |
| 2014/0304107 A1* | 10/2014 | McAllister | G06Q 10/087 705/26.7 |
| 2014/0324246 A1 | 10/2014 | Biber et al. | |
| 2014/0324269 A1 | 10/2014 | Abramson et al. | |
| 2014/0330496 A1 | 11/2014 | Crouse et al. | |
| 2015/0012164 A1 | 1/2015 | Yu et al. | |
| 2015/0134177 A1 | 5/2015 | Lee | |
| 2015/0202770 A1* | 7/2015 | Patron | G05D 1/024 700/245 |
| 2016/0174459 A1* | 6/2016 | Balutis | B25J 9/0081 701/25 |
| 2016/0271795 A1* | 9/2016 | Vicenti | B25J 9/163 |
| 2016/0271796 A1* | 9/2016 | Babu | B25J 9/163 |

FOREIGN PATENT DOCUMENTS

| | | |
|---|---|---|
| GB | 2307062 A | 5/1997 |
| GB | 2382157 A | 5/2003 |
| GB | 2386971 A | 10/2003 |
| WO | 200239063 A1 | 5/2002 |
| WO | 2013185622 A1 | 12/2013 |
| WO | 2014058358 A1 | 4/2014 |
| WO | 2014079632 A1 | 5/2014 |
| WO | 2015072896 A1 | 5/2015 |

* cited by examiner

DOMESTIC ROBOTIC SYSTEM AND METHOD

CROSS-REFERENCE TO RELATED APPLICATIONS

This application claims priority to GB1419883.2, filed Nov. 7, 2014, and also to GB1505078.4, filed Mar. 25, 2015.

TECHNICAL FIELD

The present invention relates to robotics and, in particular, to navigation and operational modes for domestic or home robotics.

BACKGROUND

The use of automated devices is widespread nowadays, and finds countless applications. For instance, robots perform very precise and delicate tasks in the construction of electronic devices, or in medicine and aviation. Robots are also used in applications which require motion, notably, for automatic warehouses, where goods are retrieved and stored by means of computed-actuated robots. Other applications include, e.g., fetching raw materials in the course of industrial manufacturing, and removing and packaging finished pieces.

In home, or domestic robotics, attempts have also been made to exploit robots for such tasks as lawn mowing, snow-blowing, leaf-clearing, floor cleaning, pool cleaning and vacuum cleaning. Hereinafter, the terms domestic robotics and home robotics are used in contradistinction to industrial robotics; thus, the user of a home or domestic robotic system will be an average consumer and cannot be presumed to have the skills required to carry out complex maintenance or setup of the system, as might be the case in industrial robotics. In addition, ease of use and simple and robust setup procedures may be particularly important in home or domestic robotic systems.

It will therefore be noted that a sub-category of such domestic robots is garden-based robots, which include robots able to perform the aforementioned tasks of lawn mowing, snow-blowing and leaf-clearing. Robotic lawnmowers are a particularly commercially successful example of such an autonomous machine, substantially reducing the time and effort required on the user's part in order to maintain a neatly-kept lawn.

By their very nature, autonomous machines such as robots represent a significant labour-saving for consumers. Repetitive and time-consuming tasks may now be carried out without significant supervision or instruction by the user of such autonomous machines. In order to further reduce the amount of supervision and instruction necessary, sophisticated control systems have been proposed that further increase the independence of the machines.

Area coverage by robotic appliances is used in a growing number of applications, such as robotic lawn mowers, robotic vacuum cleaners, robotic window cleaners, robotic painting and the like. In such applications the robot is typically moving within a working area (such as the floor of a room, in the case of a robotic vacuum cleaner, or a lawn or garden in the case of a robotic lawnmower or snow-blower) defined by a boundary. The robot may be provided with sensors (such as tactile, optical, electromagnetic sensors etc.) to detect this boundary directly.

The robot typically carries a payload (which may include one or more cutting blades, vacuuming nozzles, rotating brushes, painting brushes etc., depending on the function that the payload is intended to provide) across the entire area until adequately covered.

There are various strategies of area coverage, such as random and systematic coverage and various paths of movement used for the actual scanning such as straight lines (either parallel or with varying directions), spirals etc.

Even with the numerous control systems and methods for autonomous navigation by robots within a working area, navigation of a domestic robot within a working area has not yet been perfected; for example, issues in terms of efficient coverage of the area, ease of setup of the system and safety remain. Aspects of the invention may address one or more of these issues and may additionally or instead address other issues in domestic robotics.

SUMMARY

Aspects of the invention are set forth in the appended claims.

According to an aspect of the following disclosure there is provided a domestic robotic system including a robot having a payload for carrying out a domestic task within a working area. The robot also includes a plurality of sensors, including one or more local environment sensors that are configured to receive signals from exterior sources local to the robot. The system further includes data storage, which is operable to store boundary information that defines the path of a predetermined boundary within which the robot is permitted to move. The robot is programmed to operate in at a reference trail recording mode and a navigation mode. In the reference trail recording mode, the robot moves along a reference trail while receiving sensor information from its sensors, with the path of the reference trail being calculated by the system based on the stored boundary information so as to be spaced apart from the path of the predetermined boundary. Also in the reference trail recording mode, the system stores reference trail information corresponding to a first plurality of points along the reference trail. This reference trail information is derived from the sensor information corresponding to the first plurality of points. In the navigation mode, the robot moves within the working area and navigates by: receiving current sensor information from its sensors; and, when it is in the vicinity of the reference trail, comparing the current sensor information with the reference trail information in order to determine its current position.

According to a further aspect of the following disclosure there is provided a garden-based robotic system including a robot and data storage operable to store data defining the boundary of a working area within the garden, the robot including: a payload actuable to perform work on a portion of the garden adjacent the robot; and one or more positioning systems. The robot is programmed to operate in at least a perimeter coverage mode and an internal area coverage mode. In the perimeter coverage mode, the robot, using the one or more positioning systems, moves within a perimeter area with its payload active, the perimeter area being defined within the robot's programming such that it is adjacent to and generally follows the path of the boundary. In the internal area coverage mode, the robot, using the one or more positioning systems and the data defining the boundary of the working area, moves within an interior area with its payload active. The interior area is defined within the robot's programming such that it is generally located within the perimeter area. The accuracy of the one or more positioning systems is greater during the perimeter coverage mode than during the internal area coverage mode. The interior area and the perimeter area are further defined within the robot's programming such that the interior area approaches to or overlaps with the perimeter area sufficiently to substantially avoid gaps between the area that is in practice covered by the payload during the internal area coverage mode, taking into account the accuracy of the one or more positioning systems during the internal area coverage mode, and the area that is in practice covered by the payload during the perimeter coverage mode, taking into account the accuracy of the one or more positioning systems during the perimeter coverage mode. The interior area is further defined within the robot's programming to be sufficiently distant from the boundary of the working area to substantially avoid the robot in practice moving beyond the boundary during the internal area coverage mode, taking into account the accuracy of the one or more positioning systems during the internal area coverage mode.

According to a still further aspect of the following disclosure there is provided a domestic robotic system comprising a robot having a payload for carrying out a domestic task within a working area. The robot is programmed to operate in at least a reference trail recording mode and a navigation mode. In the reference trail recording mode, the robot is guided along a reference trail while receiving sensor information from one or more sensors provided on the robot, at least some of which are local environment sensors that are configured to receive signals from one or more exterior sources local to the robot. Also in the reference trail recording mode, the system stores reference trail information corresponding to a first plurality of points along the reference trail, with the reference trail information including local environment information at the first plurality of points, the local environment information being sensor information from the local environment sensors that has either been partially processed, in that the position of the robot is not determined, or that is unprocessed. In the navigation mode, the robot moves within the working area and navigates by: receiving current sensor information from one or more sensors provided on the robot, at least some of which are local environment sensors that are configured to receive signals from one or more exterior sources local to the robot; and by determining information concerning the robot's current position relative to at least one of the first plurality of points along the reference trail including by comparing the current sensor information from the local environment sensors with the local environment information corresponding to the at least one of the first plurality of points.

According to yet a further aspect of the following disclosure there is provided a domestic robotic system comprising a robot having a payload for carrying out a domestic task within a working area. The robot is programmed to operate in at least a reference trail recording mode and a navigation mode. In the reference trail recording mode, the robot is guided along a reference trail while receiving sensor information from one or more sensors provided on the robot. Further, in the reference trail recording mode, the system stores intermediate information corresponding to a first plurality of points along the reference trail, the intermediate information including unprocessed and/or processed sensor information corresponding to the first plurality of points. Still further, in the reference trail recording mode, the system retrieves and post-processes the intermediate information so as to provide post-processed information corresponding to a second plurality of points along the reference trail. Furthermore, in the reference trail recording mode, the system stores reference trail information, the reference trail information including the post-processed information corresponding to the second plurality of points along the reference trail. In the navigation mode, the robot moves within the working area with the payload active and navigates by: receiving current sensor information from one or more sensors provided on the robot; and by determining information concerning the robot's current position relative to at least one of the second plurality of points along the reference trail using the current sensor information and the post-processed information.

According to a still further aspect of the following disclosure there is provided a method for preparing navigation information for a robot having a payload for carrying out a domestic task within a working area comprising: receiving sensor information relating to the working area, including one or more arrays of sensor data, each array corresponding to sensor readings at different locations and/or orientations with respect to the working area by one or more similar arrays of like sensors; receiving user-provided information designating a reference trail within the working area; processing: the sensor information relating to the working area, including the plurality of arrays of sensor data; and the information from the user designating the reference trail; the processing step producing navigation information for the robot that sufficiently defines the reference trail such that the robot can move along the reference trail substantially autonomously.

According to a still further aspect of the following disclosure there is provided a domestic robotic system comprising a robot having a payload for carrying out a domestic task within a working area; the robot being programmed to operate in at least a reference trail recording mode and an area coverage mode. In the a reference trail recording mode: the robot is guided along a reference trail while receiving sensor information from one or more sensors provided on the robot; the system stores reference trail information corresponding to a first plurality of points along the reference trail, the reference trail information being derived from the sensor information corresponding to the first plurality of points. In the area coverage mode, the robot moves within the working area with the payload active, during which the robot navigates by: receiving current sensor information from one or more sensors provided on the robot; and using the current sensor information the robot to follow, with the payload active, one or more paths upon each of which the robot is a respective, substantially constant distance from the reference trail defined by the stored reference trail information. One of the one or more paths is selected as a new reference trail, with new reference trail information corresponding to a first plurality of points along the new reference trail being derived from sensor information from the same one or more sensors utilised during the area coverage mode and stored by the system, with further navigation in the area coverage mode being based on the new reference trail.

According to yet a further aspect of the following disclosure there is provided a domestic robotic system comprising a robot and data storage operable to store data defining the boundary of a working area, the robot comprising: a payload actuable to perform work on a portion of the garden adjacent the robot; a first positioning system; and a second positioning system that uses one or more sensors operable to sense directly the boundary of the working area and the robot's current distance thereto. The robot is programmed to operate in at least an area coverage mode and a boundary proximity mode. In the area coverage mode, the robot navigates within the working area, with the payload active, using the first positioning system and the stored data defining the boundary of the working area. In the boundary proximity mode, the robot navigates within the working area using the second positioning system. The robot is further programmed to switch between the area coverage mode and the boundary proximity mode when the second positioning system detects the boundary of the working area with a confidence level greater than a predetermined value. Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Aspects of the disclosure will now be described with reference to the accompanying drawings, in which.

DETAILED DESCRIPTION

Figure 1:
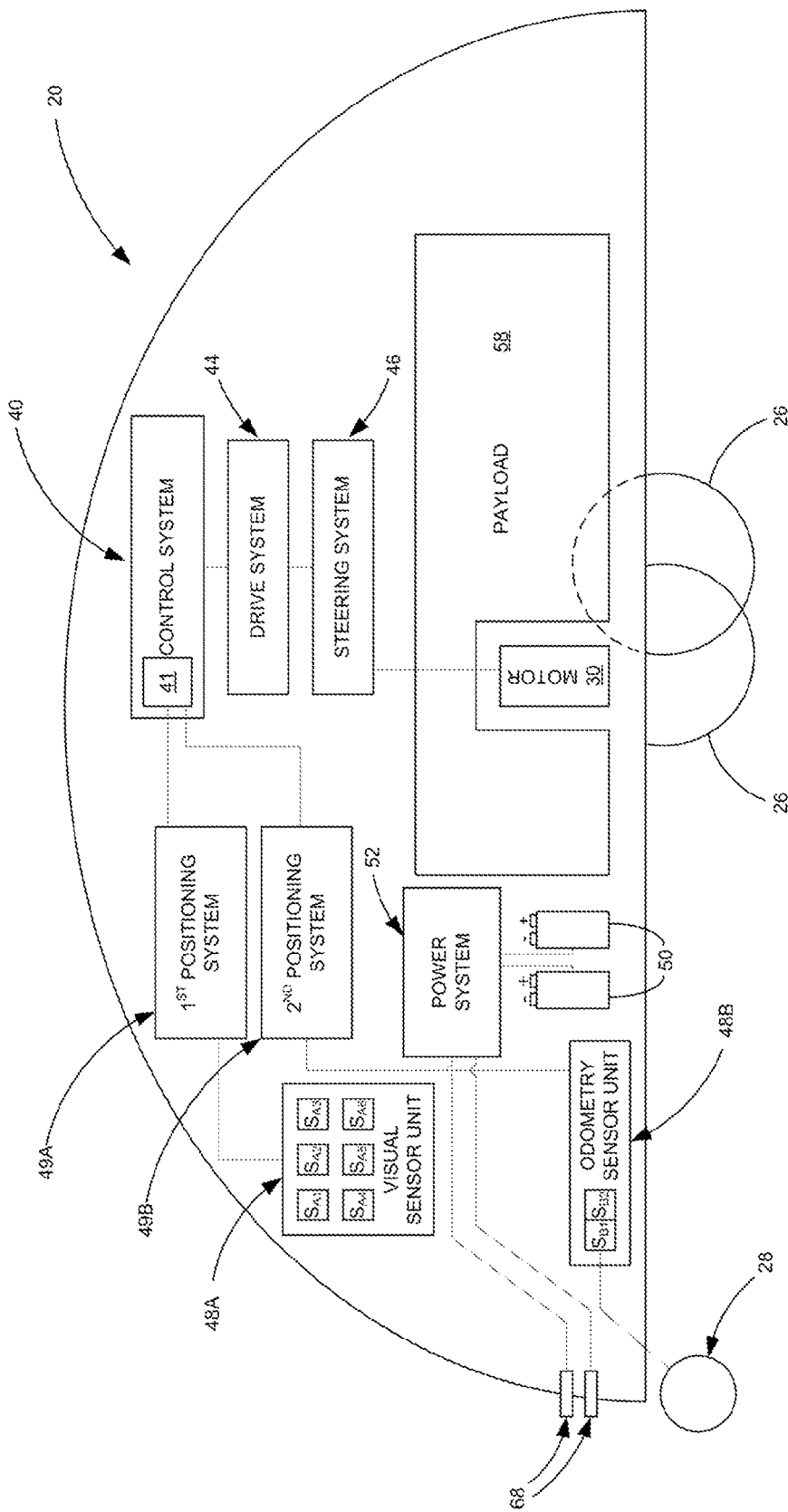
FIG. 1 details an example of a domestic robot.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method, with various computer components. The computer components may be in the form of hardware embodiment, software (including firmware, resident software, micro-code, etc.) or an embodiment combining software and hardware aspects that may all generally be referred to herein as a "circuit", "module" or "system".

The following disclosure describes several distinct (though in many cases complementary) approaches to providing a domestic robotic system and method:

1. Navigation using a reference trail
2. Separate perimeter and area coverage
3. Boundary over-ride
4. Navigation using a "skeleton" reference trail As will be discussed below, these different approaches may be combined in various ways. Examples of implementations of these approaches (including combinations of these approaches) are set out in Sections 5 and 6.

As discussed above, in domestic robotic systems and methods, a robot may be provided with a payload (which might include a cutting-blade and motor unit, in the case of a robotic lawnmower, or a nozzle and vacuum unit, in the case of a robotic vacuum cleaner) for carrying out a domestic task within a working area. As also noted above, despite efforts, navigation of a domestic robot within a working area has not yet been perfected.

FIG. 1 details an example of a robot 20 suitable for operation as part of domestic robotic systems according to the following disclosure.

The control system 40 for the robot 20 is shown in FIG. 1, which is a block diagram showing the relationship of the components, but it will be appreciated that each of the components may be electrically linked or coupled to any other component for proper operation of the robot 20.

The control system 40 may include a main board, and all electronics, as hardware, software and combinations thereof and other components, necessary for the robot 20 to perform all of its operations and functions (known as the main board electronics). The main board includes one or more processors 41 as part of the main board electronics.

As may also be seen from FIG. 1, the robot 20 typically includes a body 22, supported by a chassis that supports various mechanical and electrical components, and systems involving these components. As is also visible form FIG. 1, the body 22 and chassis ride on driven wheels 26 28, rollers or the like, that with the related electronics, components and systems, as detailed below, as well as combinations thereof, form a movement system for the robot 20 (for moving the robot over a surface or the like).

A drive system 44 coupled to the driven wheels 26 is electrically coupled to the main board. The electronics of the main board, coupled with the drive system 44, may function, for example, in moving the robot 20 within the working area, as well as moving the robot 20 toward and back into the working area, including specific sections of the working area, from outside the working area, mapping a working area or section thereof, and moving between sections of the working area.

In the robot 20 shown in FIG. 1, there are two oppositely disposed wheels 26 at the sides of the robot 20, each driven by motors 30 (independent of each other), to allow for steering of the robot 20. There is also one non-motorized or passive wheel 28, at the front of the robot. As will be explained in greater detail below, this wheel 28 may be used to measure distance, direction and the like by using a sensor $S_B$ that forms part of an odometry sensor unit 48B.

The motors (M) for the driven wheels 26 are typically computer controlled, specifically by the control system 40, more specifically still by the processor(s) 41 thereof. The motorized 26 and/or non-motorized 28 wheels may be part of a drive system 44, a steering system 46. More particularly, the drive system 44 may control the steering system 46. All of the aforementioned systems are integrated and are typically part of and controlled by the control system 40, and allow for movement of the robot 20 as well as performing the processes and methods detailed below.

The axle of the front wheel 28 may be arranged so that it extends into a vertical rod section and may be slideably mounted in a vertical orientation in a well in the body of the robot. Within the well is a sensor ($S_{B1}$) that detects wheel position and, more specifically, the orientation of the wheel, by detecting the position of the vertical rod section. There may also be provided a sensor $S_{B2}$ on the front wheel that counts the number of revolutions of the wheel, such as an odometer. These sensors form part of the odometry sensor unit 48B, which in turn forms part of second positioning system 49B (which will be discussed in further detail below). The odometry sensor unit 48B may therefore able to measure the direction in which the robot is currently moving as well as measuring the distance the robot travels along the ground. The sensors of the odometry sensor unit 48B may be electrical contact sensors, ultrasonic or light sensors, or any other suitable sensors.

The front wheel 28 of the robot may be slideably mounted in a vertical orientation such that, when the axle/rod section, on which the front wheel 28 is mounted, slides or drops downward to a predetermined level (also caused by lifting the body 22 of the robot 20 at its front end), the rod section moves out of contact with the sensor provided within the well of the body 22 of the robot. In response, the requisite components of the control system 40 signal the drive system 44 to stop movement of the robot. This may safeguard the user from harm, particularly where the payload includes moving components and specifically blades (for example in the case of a robotic lawnmower).

As also shown in FIG. 1, the robot 20 further includes a payload 58, coupled to the control system 40. This payload 58 can be designed for various tasks, as discussed above, such as lawn mowing, vacuum cleaning, surface cleaning, floor sweeping, snow and debris removal, floor scrubbing, maintenance and the like.

The robot 20 is typically powered by an internal power supply (including batteries 50, typically rechargeable) that forms part of a power system 52, which is electrically coupled to the control system 40. Battery voltage sensors, typically for each battery 50, are also part of the power system 52.

The robot 20 may be designed such that it can be received by a docking station (not shown) which the robot 20 will return to once its task is complete (e.g. for orderly control and arrangement of the robot). Such a docking station may form a part of a domestic robotic system 10 according to embodiments of the present invention. While in this docking station, various functions can occur, such as battery recharging and the like.

The robot 20 shown in FIG. 1 therefore includes docking contacts 68 (transmission parts for the transmission of energy, electricity, signals, or the like), extending forward or laterally from the front side of the robot 20. These docking contacts 68 are typically metal or other magnetic or electrically conducting materials. These docking contacts 68 are electrically coupled to the control system 40, for example, through the power system 52. Voltage sensors (not shown), typically for each of the docking contacts 68, and electrically coupled to the docking contacts 68 and the control system 40, and are also typically part of the power system 52.

This electrical linkage allows for charging of the batteries 50 of the power system 52 once a sufficient contact is made between the docking contacts 69 and the docking station. This may be determined by the control system 40, for example by detecting whether there is at least a threshold voltage of, for example, as least 25 Volts, on the docking contacts 68, as measured by the voltage sensors.

The docking contacts 68 are typically parallel to the horizontal or ground surface. These docking contacts 68 protrude from the body 22 of the robot (examples of suitable docking contacts are described in detail in U.S. patent application Ser. No. 10/588,179 and PCT/ILO5/00119).

In the example of FIG. 1, the robot 20 also includes an array of light sensors $S_{A1}$-$S_{A6}$, which may for example, be provided by a digital camera (it may be noted in this regard that while six sensors are shown for simplicity, it will be understood that in practice very large numbers of such sensors may be provided). These sensors form part of a visual sensor unit 48A, which in turn forms part of first positioning system 49B.

1. Navigation Using a Reference Trail

The present section describes domestic robotic systems and methods where a robot, such as that described above with reference to FIG. 1, navigates by using sensor data to determine its current position relative to a reference trail that the system has been "trained" or "taught". This reference trail may then assist the robot in navigating within the working area, for example during a navigation mode.

In one example, the reference trail may define the boundary (or a part thereof) of the working area within which the robot is permitted to move.

In known systems, the delimitation of a working area may be by means of physical barriers (walls, fences), or may be by means of a field or beam that can be sensed by the robot. Examples of the latter include: "virtual" barriers, such as where a directional light, ultrasound or RF beam indicates to the robot a barrier between different areas, or different portions of an area; and continuous delimitation using a field, a typical example of which is where a wire loop is laid or otherwise provided around a designated area, with this wire transmitting a magnetic and/or electrical field. Various combinations of such approaches are also possible: for example, the working area of a lawn could be delimited in part by fences and walls and in part by light beams.

A drawback with such delimitation methods is the setup time and effort required by the customer, which often involves physical work (such as when pegging a wire loop around the garden) and complex instructions. Such difficulties with setup may result in the customer setting up the system in such a way that its effectiveness is reduced.

Hence, it may be desirable to find a way in which to improve the delimitation of a working area: for example, by reducing difficulties in setup, while maintaining a high level of navigation accuracy for the system, which will allow optimal delimited area coverage.

In some arrangements, the reference trail may therefore be a closed path, which defines substantially the entire boundary of the working area. In other embodiments it may be an open path. Such a reference trail might, in certain embodiments, define a section of the boundary of the working area. For example, the boundary of the working area may be defined in part by natural physical barriers, such as walls or fences, which may be referred to as "hard" boundaries— those beyond which the robot cannot move, or such as the edges of a lawn, which is an example of a "soft" boundary in the case of a robotic lawnmower. Thus, in one example concerning a robotic lawnmower, part of the boundary of the working area might be defined by a fence, part by the edge of the lawn (which the robot can identify using sensors provided on-board) and part by a reference trail that the system has been trained with.

In other examples, rather than being a boundary for a working area, the reference trail may be located within a working area so as to assist with navigation.

In one such example, whenever the robot crosses the reference trail, the stored reference trail information may enable it to determine its location with improved accuracy. Hence, or otherwise, the reference trail may be a path that is chosen such that there is a high likelihood that, during later navigation, the robot will find itself in a position at, or adjacent to such a reference trail. For instance, in the "Navigation using a 'skeleton' reference trail" section below, the system calculates a path for the reference trail such that it is spaced apart from the boundary.

In another such example, the robot may use the reference trail as a stored path that it may opt to travel along during a navigation mode. For instance, the reference trail could be a path (which might be chosen to be a "safe" path, e.g. a path spaced from the boundary, to decrease the likelihood that the robot leaves the working area) that the robot may opt to follow in order to reach a particular point of interest, such as a charging station, a covered area sheltered from the weather etc. Thus, the robot may navigate within the working area towards the reference trail and, once it encounters the reference trail, thereafter follow the reference trail to the particular point of interest.

1.1 Navigation Mode

The following disclosure describes a domestic robotic system including a robot that is programmed to operate in a navigation mode, such as an area coverage mode, where the robot applies the payload to the working area, or a return to base station mode, where the robot navigates through the working area to a base station (e.g. a charging station). Other navigation modes are also envisaged, such as where the robot navigates to a particular point of interest within the working area other than the base station.

In such an area coverage mode the robot may move within a working area with its payload active; such operation may continue until such time as there is a high probability that the payload has been applied to the entire area. In the case of a robotic lawnmower, for instance, this may correspond to the whole lawn (or a user-selected portion thereof) having been mowed.

1.2 Sensor Units

As shown in FIG. 1, the robot may be provided with one or more sensor units (48A, 48B), which each includes one or more sensors ($S_{A1}$-$S_{A6}$, $S_{B1}$, $S_{B2}$), to assist the robot (20) in navigating within the area. These sensors, during use, provide the robot with sensor information, such as in the form of sensor data. As also shown in FIG. 1, the sensor units (48A, 48B) may form part of a respective positioning systems (49A, 49B) provided by the robot (20). In the arrangement shown in FIG. 1, the first and second positioning systems (49A, 49B) each further include the processor (41), which is part of the control system (40) (though it will of course be understood that each positioning system (49A, 49B) could instead be provided with a dedicated processor, or the positioning systems could share a processor that is separate from the processor (41) of the control system (40)).

Each positioning system may determine an estimate of the robot's position and, optionally, orientation within the working area. For example, the processor associated with a positioning system may process information received from the sensor unit(s) that form part of that positioning system according to a routine specific to that positioning system.

In the example of FIG. 1, where the visual sensor unit (48A) forms part of the first positioning system (49A), the processor (41) runs a routine that is configured to process the visual sensor data and thereby determine an estimate of the robot's position and, optionally, orientation within the working area. Similarly, the odometry sensor unit (48B) of the example of FIG. 1 forms part of the second positioning system (49B), with the processor (41) running a routine that is configured to process the odometry sensor data and thereby determine an estimate of the robot's position and, optionally, orientation within the working area.

While the example of FIG. 1 includes only two positioning systems (49A, 49B), it will of course be appreciated that more than two positioning systems could be utilized or, indeed, only one positioning system.

Further, while in the example of FIG. 1 each positioning system (49A, 49B) includes a dedicated sensor unit (48A, 48B), it should be appreciated that two (or more) positioning systems may share a sensor unit (48A, 48B). In some examples where positioning systems share the same sensor unit, the positioning systems may be distinguished by the different routines that they utilize to process the sensor data. For instance, the sensor data from the visual sensor unit (48A) could be processed by processor (41) according to two different routines, thereby producing two corresponding estimates of the robot's position and, optionally, orientation, within the working area.

Where several different positioning systems are utilized, the robot (20) and particularly the robot's control system (40) may switch between these depending on various factors. For example, when one of the positioning systems indicates that the robot (20) is in a region near to the boundary, the control system (40) may switch to navigating using another positioning system; a robotic system using such an approach is detailed further below in the "Boundary over-ride" section.

In addition, or otherwise, where a robot includes multiple positioning systems the respective estimates of the robot's position and, optionally, location within the working area from the multiple positioning systems may be fused together using a sensor fusion algorithm, such as a Kalman filter.

The sensors of the sensor units (48A, 48B) may take various forms. A first type of sensor that may be employed receives signals from exterior the robot. This broad category covers a wide range of sensors, including those that receive light, radio waves, IR and other EM radiation, as well as ultrasound. Such sensors may be provided individually, or in groups or arrays, particularly in regularly-spaced arrays. For example, a camera may be considered as providing of an array of regularly-spaced visible light sensors, an infra-red camera an array of regularly-spaced infra-red sensors.

It should be noted that sensors within this broad category may be used to sense signals that are inherent or intrinsic to the environment, so would be present even if the robotic system were not present. Such positioning systems (or the relevant part thereof) may be "passive" in the sense that the robot itself does not generate an initial signal that is later indirectly sensed by the sensor unit (for example after the initial signal has been reflected or reemitted by the environment). An example of this is a sensor unit (or a part of a sensor unit) that senses visible light, which may be generally present in an environment, for example the garden to be mowed by a robotic lawnmower, or the room to be cleaned by a robotic vacuum cleaner.

Other "passive" sensor units may receive signals that are generated by sources exterior to the robot such as beacons or satellites. Examples include GPS (or other satellite navigation system) receivers and local positioning sensors; robots that use such systems may generally be characterized by their use of the time-of-flight of signals received from one or more external sources in order to determine its current location.

Other sensors may in contrast detect signals that result from signals initially generated by the robot itself; hence, the environment is studied based on the reflected or re-emitted signals. Such a positioning system (or the relevant part thereof) might therefore be referred to as "active" and, in examples, might make use of coded vision, or might simply involve the provision of a source of light to assist, for example, a camera or other light sensor provided on the robot in "seeing" the local environment. In one example, such a light source might generate light of only specific wavelengths so that, for example, grass might be more easily recognized by the light sensor on the robot. Further examples of "active" positioning systems may include range-finder systems; for instance, the robot might be provided with an array of lasers, with the pattern of the reflected light being analyzed by the robot to determine, for example, distances to nearby features or objects within the environment. Reflected ultrasound might also be utilized in a similar fashion: the robot might be provided with an array of ultrasound sources, for example using respective different frequencies, or a single scanning ultrasound source, with the signals reflected by the environment being detected by ultrasound sensors. The ultrasound sensors might, for example, be provided in a regularly spaced array as part of a sensor unit, though a single ultrasound sensor could also be utilized. It is also envisaged that RADAR and/or LIDAR systems may be utilized.

A further subcategory (which overlaps with the subcategories described above) within sensors that receive signals from exterior the robot is that of local environment sensors, which are sensors that are configured to receive signals from one or more exterior sources local to the robot.

In one series of examples, the field of view for the local environment sensors is directed generally in the plane in which the robot moves. In one example, such local environment sensors might include light sensors provided by a camera mounted on the robot, with the camera being oriented so as to view the robot's local environment in front of the robot (rather than, say, looking upwards at the sky). The robot could be provided with a panoramic camera with the field-of-view of the camera being directed to the front and sides of the robot (and, in the case of a panoramic camera with a 360° field-of-view, to the rear of the robot). It is also envisaged that analogous arrangements might be provided using ultrasound, RADAR or LIDAR.

Local environment sensors might also include one or more ultra-wideband (UWB) sensors provided on the robot. In such an example, there may be provided a number of UWB beacons within or adjacent to the working area whose signals the UWB sensors are operable to receive; as the beacons are within, or adjacent to the working area they may therefore be considered signal sources that are local to the robot. It may therefore be understood that the sources local to the robot can be sources that actively (in the sense that they are powered) generate the signals which are received by the local environment sensors.

A second type of sensor that may be employed directly senses the motion of the robot. Thus, the sensing field of the sensor may be confined to the robot itself (though in some cases it might extend to immediately adjacent the robot). This broad category of sensor includes both those sensors that can assist the robot in determining the magnitude of its motion (its current speed) and those sensors that can assist the robot in determining the direction of its motion. Examples of such sensors include accelerometers, gyroscopes and odometers as well as optical sensors directed at a portion of the environment immediately adjacent the robot (for example, operating in a similar fashion to an optical mouse). An even simpler example, in a robot that can move at only a limited number of speeds (or even only one speed) is a sensor that detects the time for which the robot is moving and which of these predetermined speeds it is moving with. Although in practice the actual speed might vary somewhat relative to the nominal speed, the overall accuracy of such an arrangement may be acceptable in some applications.

Many of such sensors may be described as sensing the relative motion of the robot. A known issue with sensing relative motion (including directly sensing the speed, acceleration, or angular velocity of the robot) is integration drift: determining the robot's current location typically requires the integration of these variables over time, which may therefore lead to the accumulation of systematic errors in the sensors.

It is envisaged that sensors of several of the different types described above may be utilized by the robotic system. Certain combinations may be synergistic, so that the drawbacks of one type of sensor within the system are addressed by another type of sensor within the robotic system. In this regard, it should be appreciated that different sensor types may have different accuracies. More subtly, the accuracy of certain sensor types may change over time. A particular example of this is the occurrence of integration drift with relative motion sensors, which is discussed above.

On the other hand, while relative motion sensors may suffer from integration drift, they tend to typically provide a good level of accuracy (at least initially), in contrast to many sensors that rely on signals received from exterior the robot. Thus, combining such relative motion sensors with sensors that receive signals from exterior the robot may be beneficial: over short periods of time the relative motion sensors will be accurate; over longer periods of time the sensors that receive signals from exterior the robot may provide a correction to the relative motion sensors (for example the correction might be periodic, with the period chosen depending on the rate of drift of the relative motion sensors).

Further, with sensors that receive signals from exterior the robot, there is the possibility that such signals are distorted (either periodically, or systematically), or not received at all. This may be particularly the case with "passive" systems, as described above. A simple example of such difficulties is the case of a garden-based robot where a satellite positioning signal is blocked or distorted by trees or a house. During periods where signals from exterior the robot are blocked or distorted, sensors that detect the motion of the robot directly might instead be employed, thus avoiding such difficulties and improving the robustness of the navigation by the robot.

Accordingly, it is envisaged that, in certain arrangements, a robot may include multiple positioning systems, each of which has sensors from a particular one of the categories (or sub-categories) identified above. For instance, as in the example of FIG. 1, a first positioning system (49A) might include local environment sensors (e.g. the visual sensors ($S_{A1}$-$S_{A6}$) of the visual sensor unit (48A)), while a second positioning system (49B) might include sensors operable to directly sense the motion of the robot, such as relative motion sensors (e.g. the odometry sensors $S_{B1}$, $S_{B2}$) of the odometry sensor unit (48B)). A third positioning system might also be included, for example with sensors that receive signals from exterior the robot; for example, these sensors could be provided by a GPS sensor unit. As noted above, the respective estimates of the robot's position and, optionally, location within the working area from these multiple positioning systems may be fused together using a sensor fusion algorithm, such as a Kalman filter. In this way, the robot's determination of its current location may be made robust and/or accurate.

It should be noted at this point that elements or components in the sensor unit may be capable of being replaced by the end-user: the sensor unit might be modular. This might be utilized, for example, to provide the robot with a first group of sensors for the training of a reference trail (e.g. as part of a first sensor unit component) and to replace this first group of sensors with a second group of sensors (e.g. as part of a second sensor unit component). One or both of these groups of sensors may be an array of like sensors and/or both groups of sensors may be of the same or similar type (e.g. light sensors). For instance, a 3D camera might be provided for the training of the reference trail, with this being replaced by a 2D camera for normal navigation, such as in the navigation mode.

1.3 Reference Trail Recording Mode

This section of the disclosure describes how a domestic robotic system may be "trained" or "taught" a particular reference trail, with the robot, during a navigation mode (such as an area coverage mode, or a return to base station mode), navigating by using sensor data to determine its current position relative to the reference trail that the system has been "trained" or "taught". In certain arrangements it may specifically be the robot that has been "trained" or "taught" the reference path. This subsection of the disclosure describes a Reference Trail Recording Mode, which may allow such "training" or "teaching" to take place.

1.3.1 Post-Processing of Data

During the navigation mode it is envisaged that a robot (such as that described above with reference to FIG. 1) navigates by using not only sensor information currently being received from its sensor unit, but also using post-processed information relating to the reference trail that is stored by the system, for example on data storage provided by the robot (though the data storage could equally be provided in a base station for the robot, such as a charging station, or indeed in another element, with wireless communication being provided between the element providing the data storage and the robot).

The nature of this post-processed information may be understood more fully by the following explanation of the Reference Trail Recording Mode.

In this mode, the robot is guided along a reference trail (the details of how the robot may be guided along this reference trail will be described further below) while receiving sensor information from its sensor unit(s). While travelling along the reference trail, the robot stores information (referred to hereafter as "intermediate information") relating to points lying on the trail. Specifically, such intermediate information may include the raw (unprocessed) sensor information, information derived from the sensor information using a variety of data processing algorithms, or a combination of unprocessed and processed sensor information. This intermediate information may thus function as a description of the local environment and/or the robot's position at each of these points along the reference trail.

As explained above, during the navigation mode the robot will navigate by using sensor data to determine its current position relative to the reference trail. It is therefore envisaged that the information defining the reference trail should be of high quality. More generally, it may be desirable that the reference trail information makes later navigation efficient. Hence, after the robot has traveled over a number of points along the reference trail, it may post-process the intermediate information collected for those points. Such post-processing may be carried out after the robot has traveled over substantially the whole of the reference trail, though it could also be carried out at certain intervals, for example after a predetermined time has elapsed, or after the robot has traveled a predetermined distance, or after intermediate information for a predetermined number of points has been stored.

This post-processing algorithm may take account of user-provided information regarding the reference trail. Various arrangements by which the user supplies this information are envisaged. For example, an interface might be provided remotely of the robot: this interface might be provided on a base station (such as a charging station), on the user's PC, on a remote control specifically designed for the robot, particularly a hand-held remote control, or another hand-held electronic device (such as a smart phone).

An example of the user supplying information regarding the reference trail is the user indicating that the reference trail is a closed path. This may allow the robot to convert the sensor information captured at a number of points along the reference trail into information relating to the respective locations of each of those points, where this information is calculated such that the locations describe a closed path. In the absence of such post-processing, if the sensor information (or a portion thereof) was from relative motion sensors, the drift of such sensors over the course of the reference trail might incorrectly suggest that the reference trail was an open path. Therefore, if such sensor information were saved and referred to later during the navigation mode, the robot might be prone to navigation errors.

It should be appreciated that, rather than saving the raw sensor information as intermediate information for the reference trail, the system could instead partially process the sensor information to give an estimate of the robot's position at each point on the reference trail, with this position estimate being stored as part of the intermediate information. Such processing could be carried out on-the-fly; the later post-processing may then be seen as correcting the position estimates stored as intermediate information.

The post-processing algorithm might also include interpolation of the intermediate information. Thus, intermediate information corresponding to a first number of points (N) on the reference trail may be inputted into the post-processing algorithm, with the algorithm then outputting post-processed information corresponding to a second number of points (M) along the reference trail, where M>N.

It will be appreciated that the output of the post-processing algorithm or process, the post-processed information, may correspond to a number of points on the reference trail. However, from the example given above regarding interpolation of the sensor information it will be appreciated that these points need not be the same as the points at which sensor information was originally received by the robot and in respect of which the intermediate information was stored. Furthermore, it should be appreciated that the outputted post-processed information is not necessarily in the same format or of the same type as the intermediate information stored by the robot. For example, if the sensors provide the robot's relative speed at a number of points on the reference trail, this might be converted by the post-processing algorithm to location data for a number (not necessarily the same number) of points on the reference trail.

It should further be noted that it is envisaged that the intermediate information might be derived from only certain types of sensors and therefore only information derived from such sensors would be post-processed. For example, the intermediate information might only be derived from sensors operable to sense the relative motion of the robot, such as those of the odometry sensor unit (48B) shown in FIG. 1. Alternatively the intermediate information might only be derived from one or more arrays of like sensors (e.g. arrays of like local environment sensors, which might, for instance, be provided by a 2D or 3D camera).

Nonetheless, the reference trail information that is saved might include both the post-processed sensor information and un-post-processed information. Such un-post-processed sensor information could, for example, include estimates of the robot's position at each of the points on the reference trail where intermediate information was collected. Such positional estimates could be provided by additional sensors that are different to those from which the intermediate information is derived.

Such additional sensors might estimate the robot's current position based on the time-of-flight and/or relative signal strength for signals received from one or more external sources (as with, for example, a satellite positioning system), or might instead include relative motion sensors, for example provided by an inertial measurement unit (IMU).

Combinations of both such types of sensors are also envisaged. For example, one positioning system using sensors operable to receive signals from exterior the robot (e.g. provided by a GPS sensor unit) may provide a corresponding estimate of the robot's location and, optionally, orientation. Another positioning system using sensors operable to sense the relative motion of the robot (e.g. provided by an IMU) may provide another estimate of the robot's location and, optionally, orientation. The respective estimates of the robot's position and, optionally, location within the working area from these multiple positioning systems may be fused together on-the-fly by the robotic system using a sensor fusion algorithm, such as a Kalman filter. These on-the-fly estimates of the robot's location produced by the sensor fusion algorithm while travelling along the reference trail may then form a part of the reference trail information that is saved.

It is further envisaged that the robot could, during the navigation mode, navigate by using both the post-processed and the un-post-processed information (and might simply use all types of the saved reference trail information), as well as using sensor information currently being received from its sensor unit.

1.3.2 Feature Detection

In some arrangements, the intermediate information may include sensor information from local environment sensors that has been processed using a feature detection process. Suitably, the sensor information to be processed by the feature detection process may be provided by an array of like local environment sensors. The sensors of such an array might, without limitation, be able to detect light (for example, they might be provided by a 2D or 3D camera and coded vision might in addition be utilized), or other EM radiation (such as IR, or UWB), or ultrasound.

Alternatively (or perhaps additionally) the robot might be provided with a scanning transmitter and, for example as part of the sensor unit, one or more sensors operable to receive the signals reflected by the local environment in response to the action of the scanning transmitter. The action of the scanning transmitter (e.g. a single scan) may be repeated for each point on the reference trail. The speed with which the transmitter scans the environment is suitably faster than the speed of movement of the robot so that the sensor information received from a single scan by the transmitter substantially corresponds to a single point on the reference trail. In an exemplary arrangement, the robot might be provided with a scanning ultrasound emitter, which sweeps, for example 360 degrees around the environment, and an ultrasound sensor, which, receives the signals reflected from the environment. A similar approach might be adopted using a scanning light beam (e.g. a laser) and one or more light sensors, which receive the signals reflected from the local environment, as in LIDAR systems. Based on the time taken for the reflected signals to return, the robot may therefore generate a "map" of its local environment at that point on the reference trail, which consists of the distance to nearby features reflecting ultrasound at different angles. This "map" information may then be processed with a suitable feature detection process, as above. For example, features of particularly high contrast might be identified.

A similar approach might be adopted with a "passive" sensor unit. Specifically, in such an arrangement, one or more scanning sensors may be provided on the robot, for example by locating the sensors on a rotating mount. These sensors may be any of a wide variety of types, including without limitation light and IR sensors.

Hence, or otherwise, for each point on the reference trail, the system may acquire one or more arrays of sensor data from the local environment sensors. Thus, for each point on the reference trail there may be an associated N arrays of sensor data, where N≥1. For instance, in the case of a 2D camera, there may be (at least) one 2D array of sensor data for each point; in the case of a 3D camera, there may be (at least) two 2D arrays of sensor data for each point. It will be appreciated that arrangements might also make use of 1D arrays of sensor data.

Each element of such an array of sensor data may, for example, correspond to a particular field-of-view, with the fields-of-view of neighboring elements within the data array being offset at least angularly, for instance by a uniform amount. As discussed above, this may be accomplished either by having a corresponding array of local environment sensors, or with a scanning arrangement of local environment sensors. In this way, the array of sensor data as a whole corresponds to an overall field-of-view.

In some embodiments, the field-of-view corresponding to the array may be directed generally in a plane parallel to that in which the robot may move, such as the horizontal plane. Hence, or otherwise, the field-of-view corresponding to each element within the array may be directed at a corresponding angle with respect to the horizontal plane of less than 60 degrees, less than 45 degrees, or less than 30 degrees, depending on the particular sensor unit utilized.

Figure 2:
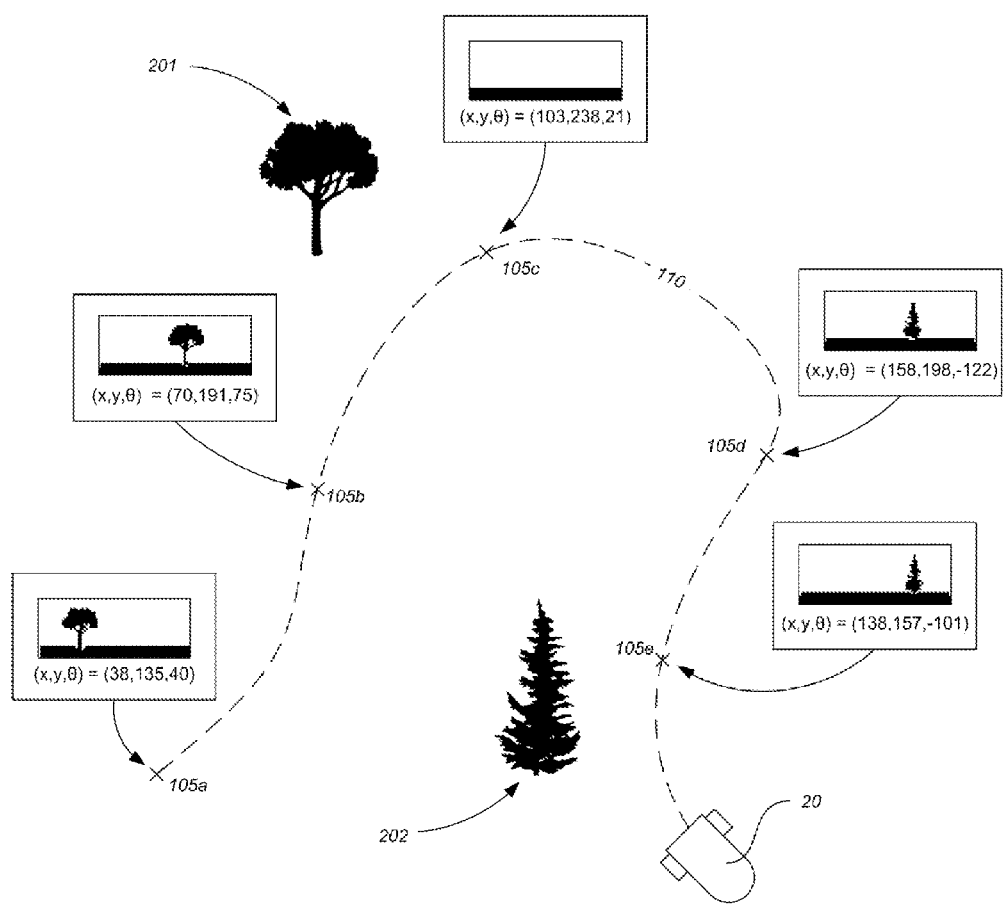
FIG. 2 illustrates an example of a robot being trained with a reference trail, where the robot includes a camera.

FIG. 2 shows an example of a robotic system where a robot 20 that is provided with an array of local environment sensors is operating in a "reference trail recording mode", thereby recording a reference trail (110). As may be seen each point (105a-105e) on the reference trail (110) that is being recorded has associated with it a 2D array of sensor data from the local environment sensors. In the particular example shown in FIG. 2, the robot (20) includes a visual sensor unit (48A), as in the robot of FIG. 1, with an array of light sensors ($S_{A1}$-$S_{A6}$) which may for example, be provided by a 2D digital camera. Thus, for each point (105a-105e) on the reference trail (110), a corresponding image is stored. In the example of FIG. 2, array of light sensors ($S_{A1}$-$S_{A6}$) is directed in the robot's forwards direction. Accordingly, the images broadly correspond to the environment that the robot is likely to encounter if it continues to move forwards.

While only five points (105a-105e) are shown on the reference trail (110) of FIG. 2, it will be appreciated that, in practice, the density of points on the reference trail (110) would be far greater, but that a lower density of points (105a-105e) is shown in FIG. 2 for the sake of clarity.

As may be seen from FIG. 2, as the robot travels past points 105a and 105b a first tree (201) is visible to the local environment sensors. Then, as the robot (20) travels through point 105c, it loses sight of the first tree (201). Travelling further along the path, through points 105d and 105e, a second tree (202) then becomes visible.

As also shown in FIG. 2, each point (105a-105e) on the reference trail (110) is additionally associated with an estimate of the robot's location and orientation within the working area, provided by a positioning system that uses sensors other than the local environment sensors, for example a positioning system including an IMU or a GPS sensor unit. The estimate of the robot's location and orientation within the working area could also be provided by a sensor fusion algorithm operating on the respective estimates provided by a combination of positioning systems.

Returning now to the general principles of robotic systems according to this disclosure, it is envisaged that a number of feature detection processes may be suitable. These may, for example, utilize edge detection, corner detection, or blob detection. The processes may for instance identify high contrast features within the sensor information received at each point on the reference trail.

Rather than storing sensor information (or perhaps in addition to storing sensor information), the system may then store feature description information for each point on the reference trail. Equally, the system may store the un-processed sensor information, or sensor information that has been processed by a process other than a feature detection process, and then carry out a feature detection process on such stored information during a navigation mode, rather than during the reference trail recording mode.

The feature description information may define each feature in such a way that it is invariant to uniform scaling, and changes in orientation. Examples of algorithms that might be utilized for feature detection and description include SIFT, SURF, GLOH and HOG.

Where sensor information has been processed using a feature detection process, e.g. where the intermediate information includes sensor information from local environment sensors that has been processed using a feature detection process, or where the post-processing itself includes a feature detection process, the post-processing may include finding features that were common to a group of points on the reference trail. In some arrangements, the reference trail may be split into segments, with the points of each segment having a number of common reference features. It is envisaged that such segments may be contiguous and/or non-overlapping and that the sizes of such segments will typically vary. Such approaches may be useful, for example, because certain features may only be detectable when the robot is in a corresponding portion of the working area. For instance, in the case of a garden-based robot, the corners of a house might only be visible when the robot is on one side of the garden. In another example, where the robot turns while moving along the reference trail, a certain group of reference features may leave the field of view of its sensors.

An example of this is shown in FIG. 2, where the first tree (201) is visible to the robot's local environment sensors when it is at points 105a and 105b, but is no longer visible as the robot reaches point 105c. Similarly, the second tree 202 is visible only at points 105d and 105e. Thus, the reference trail (110) shown in FIG. 2 might be separated into three segments: a first, corresponding to points 105a and 105b; a second, corresponding to point 105c; and a third, corresponding to points 105d and 105e.

The post-processing may further include a feature comparison process, where the different appearance, or representation of the same feature within the sensor information at various points is analyzed. For example, the same feature will likely be scaled differently within the sensor information corresponding to different points. Further, the same feature may have a different position within the sensor information for each different point. The feature comparison process may therefore include analyzing the different scaling and/or position of this feature within the sensor information for these points. Such a comparison may enable the system to determine the location and, optionally, the orientation of the feature relative to each of the points where the feature was detected.

Such an arrangement may be considered an example of a feature locating process, which identifies reference features that are common to a group of points within said first plurality of points and which, using the intermediate information corresponding to the group of points, determines the positions within the working area of such common reference features.

Such a feature locating process may utilise sensor information from sensors other than the local environment sensors, whose information was analysed using the feature detection processes. These additional sensors may provide the system with an estimate of the robot's position and orientation at each of the points on the reference trail. Such additional sensors might determine the robot's current position based on the time-of-flight for signals received from one or more external sources (as with, for example, a satellite positioning system) and/or the relative signal strength of signals received from one or more external sources. Such additional sensors might instead include relative motion sensors, for example provided by an inertial measurement unit (IMU).

Combinations of both such types of sensors are also envisaged. For example, one positioning system using sensors operable to receive signals from exterior the robot (e.g. provided by a GPS sensor unit) may provide a corresponding estimate of the robot's location and, optionally, orientation. Another positioning system using sensors operable to sense the relative motion of the robot (e.g. provided by an IMU) may provide another estimate of the robot's location and, optionally, orientation. The respective estimates of the robot's position and, optionally, location within the working area from these multiple positioning systems may be fused together on-the-fly by the robotic system using a sensor fusion algorithm, such as a Kalman filter. These on-the-fly estimates of the robot's location produced by the sensor fusion algorithm while travelling along the reference trail may then form a part of the reference trail information that is saved.

With sensors where the sensor information is in the form of images (for example where the sensors are provided by a camera), or similar 2D arrays of sensor data (for example produced by ultrasound sensors or RADAR or LIDAR light sensors, whether in a 2D array or in a scanning arrangement) the feature locating process might include a bundle adjustment process. Thus the different representation of multiple features in sensor information corresponding to multiple points may be analysed. Of course, those skilled in the art will appreciate that analogous processes could be used where different types of local environment sensors are used. Such feature locating processes may determine the location within the working area of the features (or, more particularly, the location within the working area of the physical element corresponding to the features) using the relative magnitudes and/or positions of features within the respective arrays of sensor data for different points on the reference trail.

Still further, where the sensor information is provided by two (or potentially more) arrays of like local environment sensors that are offset and/or angled with respect to one-another (as in a 3D camera), the angular or spatial offset between the arrays may be taken into account in the feature locating process. In an example where a 3D camera is utilised, this is essentially a stereo vision analysis; those skilled in the art will appreciate that analogous processes may be used where different types of local environment sensors are used. Such an approach may find matching features in the information from each of the arrays and then compare the different representation of the same features as part of the feature locating process.

In certain arrangements, a segmentation process, for example as described above, may be carried out prior to the feature locating process, thereby splitting the reference trail into segments, with the points of each segment having a number of common reference features. A feature locating process could then be carried in respect of each of these segments in turn. In this way, the feature locating process may be broken into several smaller tasks, which may utilize less memory and/or processing power.

Once the physical positions of the common reference features have been determined by the feature locating processes described above, they may be stored as part of the post-processed information, for use during later navigation by the robot within the working area.

During such later navigation, the robot may again detect features within the sensor information from local environment sensors provided by the robot. This feature detection may utilize a similar, or the same, feature detection algorithm as during the reference trail recording mode. The robot may then refer to the stored feature description information to compare the features currently detected with the features within the stored feature description information and thereby determine information relating to its position (such as an estimate of its position and, optionally, orientation, or on which side of the reference trail it is, or whether it is inside or outside the reference trail).

1.4 Navigation Using Post-Processed Information

As discussed above, the robot may operate in a navigation mode, during which a robot (for example that described above with reference to FIG. 1) navigates by using sensor data to determine its current position relative to a reference trail that the system has been "trained" or "taught". This sub-section will describe navigation by the robot using post-processed information (discussed above) as well as the current sensor information.

More specifically, it is envisaged that the navigation includes determining information concerning the robot's current position relative to at least one of the points along the reference trail for which post-processed information was stored.

In some cases, the information determined will include an estimate of the robot's current location relative to the near-most of these points along the reference trail and might also include an estimate of the orientation of the robot relative to a tangent to the reference trail at the near-most point.

In other cases, this information might simply be which side of the reference trail the robot currently is. This might be considered information concerning the robot's location relative to a number of proximal points on the reference trail, rather than just a single point. In a specific example, where the reference trail is a closed path, the information could be whether the robot is within this closed path.

Typically, there may be more time available for the recording of the reference trail, as compared with the time available for carrying out navigation during normal operation, for example during the Navigation Mode. Specifically, the user may be willing to tolerate the robot taking more time during a setup phase, whereas during normal operation, since the user may not be able to enter the working area while the robot is working with the payload active, the user may be less tolerant of delay. Thus, it is envisaged that the process by which sensor information is post-processed during the Reference Trail Recording Mode may be more computationally complex than the process by which sensor information is used to determine information concerning the robot's current position relative to the reference trail during normal navigation, for example during the Navigation Mode. More specifically, it may be desired that the post-processing during the Reference Trail Recording Mode is more computationally complex in terms of its time complexity (though it might instead or in addition be more computationally complex in terms of its space complexity).

The extra time available for post-processing may allow the system to ensure that the data stored during the Reference Trail Recording Mode is of high quality and/or enables efficient navigation. Referring to one example given above, the user might supply information indicating that the reference trail is a closed path. This may allow the robot to convert the sensor information captured at a number of points along the reference trail into information relating to the respective locations of each of those points, where this information is calculated such that the locations describe a closed path, thus improving the quality of the stored data. Of course, the system might be arranged to receive other user-supplied information regarding the path.

Referring to another example given above, the post-processing might also include interpolation of the sensor information. Thus, sensor information corresponding to a first number of points (N) on the reference trail may be inputted into the post-processing algorithm, with the algorithm then outputting post-processed information corresponding to a second number of points (M) along the reference trail, where M>N.

Referring to a still further example given above, where features are identified within the sensor information from local environment sensors and feature description information is stored for each point on the reference trail, there is sufficient time for a computationally complex a feature locating process to be carried out. Such a process may include a comparison of features that are common to multiple points on the reference trail. In such cases, the later navigation may rely on the thus-calculated positions of features, rather than attempting to calculate such information on-the-fly, which might cause navigation to be less efficient.

It is further envisaged that a feature comparison algorithm might be included at a more general level in the process for determining the information concerning the robot's current position relative to points on the reference trail. This algorithm would be applied once the features local to the robot's current position have been identified and may, for example, find the point (or points) on the reference trail that have the most matching features to those identified as being local to the robot's current position. In this way, the robot may determine which of the points on the reference trail are closest.

In addition, a quantitative comparison of the matching features may be carried out. For example, the representation of such matching features within the current sensor information from the local environment sensors may be compared with the representation of such matching features within the stored local environment information from the reference trail. More specifically, the magnitude and/or position of such matching features within the current sensor information may be compared with the magnitude and/or position of such matching features within the stored local environment information from the reference trail.

The determination of the most similar point on the reference trail might also involve comparison of features. For example, the determination might involve finding the point on the reference trail whose features have the minimal differences in magnitude and/or position relative to the matching features within the current sensor information. A best-bin-first approximation might be used for such matching.

It may be noted at this point that the sensor information used for navigation during the Navigation Mode is not necessarily supplied by the same sensors as supplied the sensor information during the Reference Trail Recording Mode (though it may nonetheless be appropriate for the sensors used in each case to be of substantially the same type—i.e. both would be light, or IR etc. as the case may be). In one example, the sensors used during the Navigation Mode might include a first group of like local environment sensors (which may be suitably provided as an array), while the sensors used during the Reference Trail Recording Mode might include a second, different group of like local environment sensors (which may again suitably be provided as an array). A specific example of this (which was referred to above in the "sensor units" subsection) would be where a 3D camera is provided for the training of the reference trail, with this being replaced by a 2D camera for normal navigation, such as in the navigation mode. Accordingly, as proposed above, elements or components in the sensor unit may be capable of being replaced by the end-user and/or a modular sensor unit might be utilised.

It may also be noted that, especially where sensors of different types are provided on the robot, only the sensor information derived from one or more specific type(s) of sensor may be post-processed. In such cases, during the later process of determining information concerning the robot's current position relative to points on the reference trail, sensor information solely from sensors of the same one or more specific type(s) might be used.

1.5 Navigation Using Comparison of Data

This sub-section will describe navigation by the robot using a comparison of current sensor information from local environment sensors with sensor information from local environment sensors stored during the reference trail recording mode.

As noted the sub-section immediately above, during navigation (for example in Navigation Mode) the robot (for instance that described above with reference to FIG. 1) may, in determining the information concerning the robot's current position relative to points on the reference trail, use a feature comparison algorithm. As proposed above, this algorithm might, for example, find the point (or points) on the reference trail that have the most matching or similar features to those identified as being local to the robot's current position. In this way, the robot may determine which of the points on the reference trail are closest.

It is envisaged that the principle of determining information concerning the robot's current position relative to points along the reference trail by comparing current sensor information with stored information corresponding to certain points on the reference trail may be applied more broadly.

More particularly, in systems where the robot includes local environment sensors (which are discussed above in the "sensor units" subsection and which may generally be said to be configured to receive signals from one or more exterior sources local to the robot), the robot may store local environment information for a number of points on the reference trail. This local environment information is typically sensor information from the local environment sensors that is either partially processed, or unprocessed. Then, when the robot is navigating within the working area, for example during the Navigation Mode, it may determine information concerning its current position relative to points along the reference trail by comparing sensor information currently being received from local environment sensors (though not necessarily the same local environment sensors as were used during the Reference Trail Recording Mode, e.g. in the case discussed above where a removable 3D camera is used for the Reference Trail Recording Mode) with the stored local environment information. It should be noted at this point that post-processing of the information as discussed above need not be carried out on the information received from the local environment sensors during the Reference Trail Recording Mode: such post-processing is optional. Thus, during the Navigation Mode, the system might simply compare the raw sensor information currently being received from the local environment sensors with the raw sensor information that was received and recorded during the Reference Trail Mode. Alternatively, the sensor information received from the local environment sensors during normal navigation (for example in the Navigation Mode) might be partially processed using the same algorithm as during the Reference Trail Recording Mode, with the two results from the same partial-processing algorithm being compared in order to determine information concerning the robot's current position relative to points along the reference trail. It will however be appreciated that it is not essential that the same partial processing algorithm is used in both cases.

The nature of such "partial-processing" may be more fully understood by comparison with a more conventional approach where the robot simply processes information currently being received from its local environment sensors so as to determine its current position, for example in the form of its current X,Y,Z coordinate.

Therefore, one hypothetical approach to determining the robot's current position relative to a reference trail might be to process the information received from the local environment sensors during the reference trail so as to provide the X,Y,Z coordinates of a number of points along the reference trail. Then, during the Navigation Mode, the information received from the local environment sensors could similarly be processed to provide the robot's current X,Y,Z coordinates. The robot's current X,Y,Z coordinates could then be compared with the X,Y,Z coordinates of the reference trail and thus information concerning the robot's current location relative to the reference trail (such as whether the robot is inside or outside of the reference trail, or to one side or the other, or the robot's distance to the reference trail and its orientation relative to a tangent to the reference trail at the closest point thereupon) could then be determined.

However, it is envisaged that embodiments of the present robotic system may adopt a different approach. Specifically, rather than using the local environment information to fully determine the position of the robot, the present robotic system may only partially process the local sensor information, or may not process the local sensor information at all. By at most partially processing the local sensor information, it may be possible in some cases to reduce the amount of processing that the system is required to do while it navigates and therefore the robot may navigate more efficiently through the working area.

It has been discovered by the Applicant that, in some situations, the determination of the position of the robot with the information from the local environment sensors may lead to an inaccurate result. For example, the signals that are detected by the local environment sensors may be distorted, for example by the presence of objects within the working area. In part by utilizing partially processed or unprocessed information from the local environment sensors, embodiments of the present robotic system may reduce the impact of such distortions. Thus, navigation may be made more robust in certain embodiments of the present robotic system.

The local environment sensors used in embodiments of the present robotic system may be arranged such that the local environment information which they provide varies along the reference trail, so that the local environment may thus be said to be a reflection of, or representative of the local environment at each point. In some cases the local environment information corresponding to each point on the reference trail might be unique. In approaches that utilise feature detection, the reference features (those which are detected as being local to each point along the reference trail) may therefore vary along the reference trail.

In the example proposed further above, the robot uses a feature comparison algorithm during navigation (for example in Navigation Mode) as part of determining information concerning the robot's current position relative to points on the reference trail. As proposed above, this algorithm might, for example, find the point (or points) on the reference trail that have the most matching or similar features to those identified as being local to the robot's current position. In this way, the robot may determine which of the points on the reference trail are closest. This might be considered a qualitative comparison of the features. As a further part of the determination of information concerning the robot's current position relative to points on the reference trail, the system may include a quantitative comparison of the features.

Accordingly, the determination may include a feature comparison process, which compares the features detected at the robot's current position (the current features) with matching features identified in the stored reference trail information (the reference features) for these closest points on the reference trail (though it should be noted that the same approach could also be used for other points on the reference trail). More particularly, the feature descriptors themselves might be compared. This feature comparison process provides a quantitative result, such as an estimate of the robot's location relative to one or more of these closest points and/or the robot's orientation relative to a tangent to the reference trail at one or more of these closest points. In an example where the local environment information is an image, or similar array of data (e.g. produced by an array of like sensors, or a scanning sensor unit), the feature comparison process might analyse the relative magnifications of the features and thereby estimate the robot's location relative to a point on the reference trail and, optionally, the robot's orientation relative to the tangential direction at that point on the reference trail. By analogy, other feature comparison processes might look at the relative intensity or magnitude of features.

It may be noted at this point that the local environment sensors that supply the local environment information that is stored during the Reference Trail Recording Mode as part of the reference trail information need not be the same as the local environment sensors that are later utilised during general navigation, such as during the Navigation Mode (though it may nonetheless be appropriate for the sensors used in each case to be of substantially the same type—i.e. both would be light, or IR etc. as the case may be). In one example, the local environment sensors used during the Navigation Mode might include a first group of like sensors (which may suitably provided as an array), while the local environment sensors used during the Reference Trail Recording Mode might include a second, different group of like sensors (which may again suitably be provided as an array). A specific example of this (which was referred to above in the "sensor unit" subsection) would be where a 3D camera is provided for the training of the reference trail, with this being replaced by a 2D camera for normal navigation, such as in the Navigation mode. Accordingly, as proposed above, elements or components in the sensor unit may be capable of being replaced by the end-user and/or a modular sensor unit might be utilised.

Figure 3:
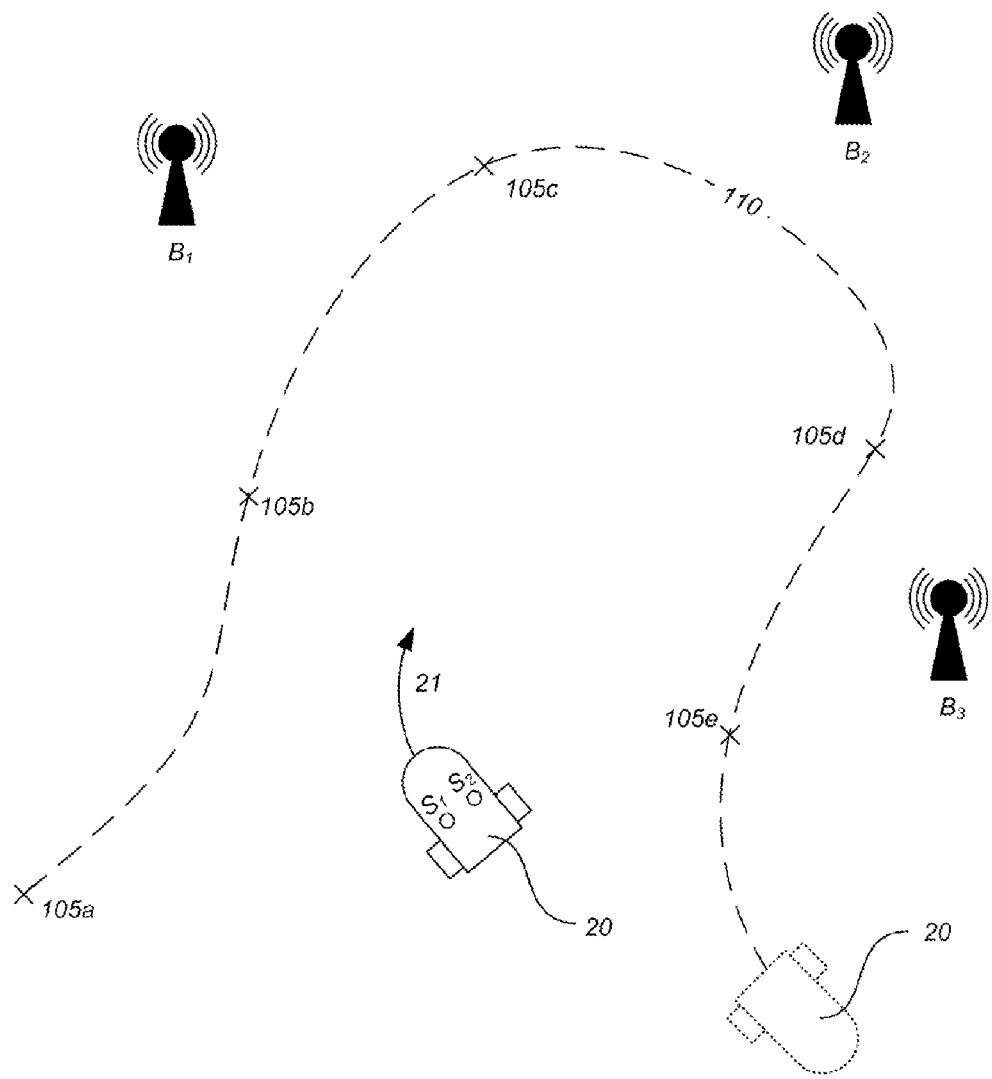
FIG. 3 illustrates an example of a domestic robotic system that utilises beacons for navigation.

Approaches for navigating by using the comparison of data are also envisaged that do not rely on feature identification/detection/comparison processes. In one example, as illustrated in FIG. 3, a number of UWB beacons ($B_1$, $B_2$, $B_3$) may be provided adjacent the working area and the local environment sensors ($S_1$, $S_2$) provided by the robot (20) are operable to sense the signals generated by these beacons. FIG. 3 shows the robot (20) navigating over the working area, once the reference trail (110) has been trained (the robot's previous position on the reference trail (110) when in the Reference Trail Recording Mode is shown in dotted line). The robot's movement is indicated by arrow 21. During the Reference Trail Recording Mode, the robot (20) records the strength of the signal from each of the beacons ($B_1$, $B_2$, $B_3$) at a number of points (105a-105e) along the reference trail.

Later, during normal navigation, such as during the Navigation Mode, the robot again senses the strength of the signal from each of the beacons ($B_1$, $B_2$, $B_3$). The system may then identify at which point on the reference trail the strengths of the respective signals from the beacons ($B_1$, $B_2$, $B_3$) received by each sensor ($S_1$, $S_2$) were most similar. In this way, the closest point on the reference trail (110) may be determined. Further, by analysing the relative strengths of the signals from the beacons ($B_1$, $B_2$, $B_3$) received by each sensor ($S_1$, $S_2$) at the closest point with the strength of the signals received by each sensor ($S_1$, $S_2$) at the robot's current point, information concerning the robot's current position relative to the reference trail may be determined, such as the robot's location and, optionally, orientation relative to the closest point on the reference trail (in which case the robot may keep a pre-determined distance from the trail, or simply use this point as a reference point for navigation), or whether the robot is inside or outside the reference trail (in which case the robot may know whether it is within or without the working area and, especially in the latter case, change its direction of motion accordingly), or whether the robot is to one side of the reference trail or the other.

It will be appreciated that in the hypothetical approach described above, the information produced and stored during the Reference Trail Recording Mode is of the same type (specifically, X,Y,Z coordinate information) as the information produced during the Navigation Mode, to which it is compared in order to determine the robot's location relative to the reference trail. The same may be true in the presently-described approach. Thus, as proposed above, substantially the same partial processing of the local sensor information may be applied during both the Reference Trail Recording Mode and the Navigation Mode, with the results of such partial processing being compared so as to determine the robot's current location relative to the reference trail.

It is also envisaged that information from sensors other than the local environment sensors may also be used. In particular, information from such other sensors may be processed to provide the robot's location at each point on the reference trail, with this position information being saved at each point on the reference trail.

The processing of the sensor information from such additional sensors may be contrasted with the processing of the sensor information from the local environment sensors, which, as proposed above, may only be partially processed, or not processed at all, before being saved as part of the reference trail information. Thus, each point on the reference trail may have associated with it position information (determined using such other sensors) and local environment information. An example of this is shown in the system of FIG. 2, where each point (105a-105e) on the reference trail (110) that is being recorded has associated with it a 2D array of sensor data from the local environment sensors, as well as an estimate of the robot's location and orientation within the working area, provided by one or more positioning systems that use sensors other than the local environment sensors.

In some cases, position information for the reference trail determined using information from such other sensors may be saved with greater frequency than the local environment information. For instance, such position information may be saved for points spaced by, for example 5 cm, whereas local environment information may be saved for points with a greater spacing, such as 25 cm. A further possibility is that position information and local environment information is stored for every point on the reference trail, but that position information for more closely-spaced points on the reference trail is estimated by using interpolation, for example as part of a post-processing of data, as described above.

Such sensors other than local environment sensors may be of various different types. For example, satellite positioning sensors (for instance provided by a GPS receiver) might be utilized, with such sensors providing the system with the robot's position in a conventional fashion. Alternatively, or in addition, relative motion sensors or sensors that directly sense the motion of the robot might be utilized, with the information provided by such sensors allowing the system to determine the robot's position both during the Reference Trail Recording Mode and during normal navigation, such as during the Navigation Mode. The combination of local environment sensors with such sensors may enable the drift in the position information from the relative motion sensors to be corrected, thus providing accurate navigation over the working area.

It should further be appreciated that sensors operable to receive signals from beacons, as described with reference to FIG. 3, might also be used as such sensors other than the local environment sensors. In such a situation, the sensor information received from these sensors operable to receive signals from beacons may be used to determine the position of the robot directly, in contrast to the approach described with reference to FIG. 3. A 2D or 3D camera provided on the robot could then provide an array of local environment sensors that would allow the robot to navigate by comparing the current sensor information from the camera with the local environment information stored during the Reference Trail Recording Mode.

1.6 Training of the Reference Trail

This sub-section will describe approaches by which the robot may be trained or taught the reference trail.

As noted above, during the Reference Trail Recording Mode, the robot is guided along a reference trail. It is envisaged that the robot (for instance that described above with reference to FIG. 1) may be guided along this reference trail according to various approaches. Such guiding typically includes the robot following a path that is primarily defined by the user, as opposed to being determined by the system itself. However, the specific amount of user involvement in the guiding process may vary: the user may not need to supervise the robot constantly during the training process.

In some cases, the user may provide the path to the system during a setup phase and the system will then later guide the robot along this path during the Reference Trail Recording Mode.

The following are examples of processes by which the user may train the system with the reference trail along which the robot is guided.

1.6.1. Manual Guiding

In this example, the system provides a prompt to the user, for instance on a display screen on the robot, to manually guide a navigation system along the desired area borders. This navigation system can be the one included on the robot, so that the user is actually driving the robot by a remote control, pushing the robot through a handle or similar. In this case, the recording of the reference trail occurs simultaneously with the manual guiding by the user. Alternatively, the navigation system may be provided by a device separate from the robot (such as a smartphone capable of recording the trajectory through a GPS or other navigation systems it embeds), with the user carrying that device, or the user may be able to detach the navigation system from the robot and carry or otherwise move it. In some such cases, the robot may then be guided along the reference trail trained using this approach, recording the reference trail while it travels over the path defined earlier by the user.

1.6.2. Following a User

In this example, the robot follows the user, identifying them using the on-board sensor system. This can be done, for example, through a vision system detecting the user or a designated marker they carry, such as an active/passive RFID which the robot can measure distance to. The robot's navigation system may simultaneously record the trajectory as it follows the user according to this approach. This approach may enable the user to easily and accurately define the reference trail to be recorded by the robot.

In case of a marker/RFID or such, it can be carried by the user, attached to their clothing or rather dragged/driven by the user through a tool carrying the marker (for example, a roller carrying a marker, where the roller trajectory is the one the robot follows).

1.6.3. Following a Marked Border

In this example, the user marks a border on the working area using material that is visually distinct from the working area, so that the user is able to easily see the trajectory they marked. The robot then follows the trail marked by this material. Suitable materials may include, without limitation, a ribbon, foam, paint or any other material that can be applied to the working are, remain there for a period of time (so the robot can follow it) and then be removed or vanish (the use of vanishing paints or foams is specifically envisaged). For ease of use, such materials may be white in color.

1.6.4. Photogrammetric Border

With the increasing availability and accuracy of aerial photos by satellites, airplanes and drones, it is possible to present the user with an interface (e.g. on their PC or smart-phone or other device) to enable them to draw the desired borders over such a photo and retrieve the border coordinates. These can be absolute coordinates (such as UTM) or relative to a certain point/s in the area (both position and angle) which can be later identified and used by the robot as the map origin.

These borders can be defined/drawn by the user or detected automatically/semi-automatically from the picture by means of image processing (classification, segmentation, border detection etc.).

More generally, navigation information for the robot may be prepared based on user-provided information. The process of preparing navigation information may be implemented using a computer such as the user's PC, smart-phone, tablet device and the like. Of course, the process could be implemented using more than one such device, such as computers connected by the internet or some other network.

As part of such a process, the user may be presented with an interface that shows them a visual representation of sensor data that corresponds to readings taken in the working area by an array of sensors (such as by presenting an image corresponding to the sensor readings). In the example discussed above, this might simply include showing the user a picture taken by a camera of the area, but it will be that a similar approach may be followed for different sensor types of sensors. Further, such an approach might be extended to sensor data corresponding to a number of readings by the same, or similar arrays of sensors at different locations and/or orientations in the working area. For example, in the case of a robotic lawnmower, a user might walk around their garden with their smart-phone or tablet device, taking pictures while they move. Using the interface, they can then mark a reference trail within this working area, for example by drawing over each of the images. Where present, the smart-phone or tablet device's positioning system may be utilized, so as to provide geo-location information for each of the pictures that may assist in the calculation of the location of points on the reference trail drawn by the user. Alternatively, the user might simply walk along the path they wish to define as their reference trail, with the geo-location information again assisting in the calculation of the location of points on the reference trail drawn by the user. In such a case, it may not be necessary to take pictures (the robot may simply use the location information to move along the reference trail), though if pictures are taken they may be processed by a feature detection/description algorithms, with the robot identifying matching features local to its current position to further assist in navigation.

Thus it will be appreciated that, in general, the navigation information produced by such a process might include feature description information (which may also include the positions within the working area of such features, for example derived from a feature locating process as discussed above) for the reference trail, determined from the sensor data, and/or positional information for points on the reference trail.

It should also be noted that, in the example given above in the "Manual guiding" sub-section where the robot's sensor system could be detached and carried or otherwise moved around the working area by the user, the sensor data received by this sensor system might also be used in similar processes for preparing navigation information for the robot.

1.6.5. Combinations

It is also envisaged that several combinations of training methods may be combined. For instance, in systems able to detect the natural borders of the area without marking (e.g. in a robotic lawnmower the border between grass/non-grass), the robot (such as that described above with reference to FIG. 1) may generally follow these natural borders, but the user may be able to over-ride this path by manual control, for instance to correct the robot's path where it incorrectly detects the natural border, or to define an artificial boundary, for example to protect a certain area that the robot should not access (e.g. in a robotic lawnmower an area being re-seeded, in a robotic vacuum cleaner a room that should not be entered). It is also envisaged that, while following the natural border, the robot may prompt the user for assistance when the reliability with which the natural border is detected falls below a pre-determined value; the user can then "teach" the robot the "correct" boundary using one of the approaches described above, for example manual control, or marking.

It should be noted that natural borders may vary along time, so following them at the point of interest and memorizing them through a navigation system, insures the system will reliably detect the border throughout the later possible changes.

1.7 Iterative Reference Trails

It is further envisaged that the training of reference trails may be incorporated into strategies for area coverage. In certain such embodiments, a systematic strategy for area coverage may be provided.

In more detail, a robot (such as that described above with reference to FIG. 1) may be programmed to operate in a reference trail recording mode and an area coverage mode. In the reference trail recording mode, similarly to the approaches described above, the robot is guided along a reference trail while receiving sensor information and records reference trail information that is derived from this sensor information. Then, during the area coverage mode, the robot follows a number of paths, each of which is parallel to the recorded reference trail, using the same sensors to navigate as were utilized during the reference trail recording mode (though the use of additional sensors in some cases is not excluded). The payload will be active during the area coverage mode and may also be active during the reference trail recording mode.

Each of these paths during the area coverage mode may be offset by a pre-determined amount from the last and there may be a predetermined amount of overlap between the area addressed by the payload during successive paths. Generally, the paths may be described as being nested, one within another. Such features may assist in ensuring that the whole working is covered.

During the area coverage mode, for example after a certain number of paths have been completed, one of the paths is selected as a new reference trail. By a similar process to that utilized in the reference trail recording mode, new reference trail information corresponding to this new reference trail is derived from the sensors as the robot travels along it. Thereafter, subsequent paths in the area coverage mode will navigate relative to this new reference trail, in place of the previously defined reference trail. In this sense, the strategy may be considered iterative.

Alternatively (or perhaps in addition), the decision to select the current path as the new reference trail could be based on the confidence with which the robot can locate itself falling below a pre-determined threshold.

Such an iterative approach may be particularly effective in systems where local environment sensors (as discussed above) are utilized. With certain such sensors, the accuracy with which the robot can locate itself may decrease with distance from the recorded reference trail, since the reference trail information is based on signals that were local to the reference trail: as the robot moves away from the reference trail these may become less "local" and thus the accuracy of the navigation may decrease.

2. Separate Perimeter and Area Coverage

The present section concerns garden-based robotic systems that may operate within a working area defined by a "virtual" boundary. Such systems therefore may include data storage operable to store data defining the boundary of a working area within the garden. As already described in the sections above, garden-based robots are typically provided with a payload actuable to perform work on a portion of the garden adjacent the robot, such as a blade in the case of a robotic lawnmower, or a high-power fan system in the case of a robotic snow-blower.

The data defining the "virtual" boundary might be in the form of co-ordinate data (such as GPS co-ordinates, co-ordinates for a local positioning system, or co-ordinates for an inertial positioning system, or combinations thereof), though more complex implementations are also possible, such as where the boundary is defined by vision data: for example, the data defining the boundary might include feature description information relating to points on the boundary (as described in detail above; in such situations, the reference trail described above may be the boundary) or, more simply, a series of images (or, by analogy, a series of arrays of data produced by arrays of like sensors). Of course, combinations of such approaches are also envisaged.

Robot's used in such systems will include one or more positioning systems, each of which includes one or more sensors; an example of such a robot is illustrated in FIG. 1. Such sensors may be of various types, such as relative motion sensors (such as odometers, accelerometers and gyroscopes), sensors operable to directly sense the motion of the robot (again, such as odometers, accelerometers and gyroscopes), and sensors operable to receive signals from exterior the robot (such as cameras, coded-vision systems, laser rangefinders, satellite positioning system receivers).

It is considered that with such systems there may be a generally greater need for accuracy in the vicinity of the boundary, as opposed to the inner portion of the working area. For example, with a robotic lawnmower, the robot departing from the area could present a safety hazard. With garden-based robots more generally, the robot could cause damage to itself by leaving the working area, even if by a small amount; for example, the robot could fall into a pond or lake. Even if the robot does not damage itself, leaving the working area, even by a small amount could result in the robot becoming stuck (for example in a flowerbed) and requiring the user's assistance in returning it to the working area. This increases the amount of supervision that the user has to provide, going against the labour-saving principle behind garden-based robotic systems. By contrast, within the interior of the working area small deviations from a nominal or desired path may not have a significant impact on the robot's performance. Where the coverage of the area is planned, there might be a very modest impact on efficiency, but this is unlikely to be objectionable to the user, especially when such a very modest decrease in efficiency is compared with the inconvenience of a stuck or damaged robot, as discussed above.

The Applicant therefore envisages that a garden-based robotic system may be provided where the robot is programmed to operate in at least a perimeter coverage mode and an internal area coverage mode. Embodiments of such systems might therefore be described as dividing the coverage of the working area into two operations. As both of these modes or operations are intended to contribute to the coverage of the working area with the payload, the payload will typically be active in both modes.

To describe more fully the nature of these two modes, in the perimeter coverage mode, the robot, using its positioning system(s) moves within a perimeter area with its payload active. The perimeter area is defined within the robot's programming such that it is adjacent to and generally follows the path of said boundary.

Figure 4A:
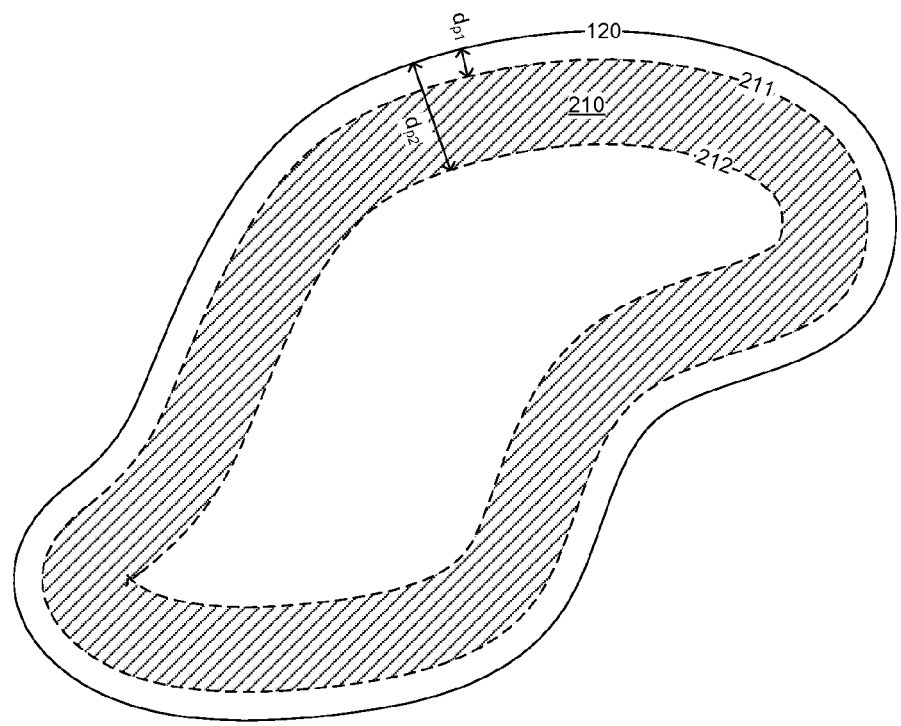
FIGS. 4A-4C illustrate an example of a domestic robotic system where a robot is programmed to operate in a perimeter coverage mode and an internal area coverage mode.

An example of this is shown in FIG. 4A, which illustrates the path of boundary (120) for a working are as stored within a robot's data storage. As shown in FIG. 4A, offset from this boundary (120) is the outer edge of a perimeter area (210); the significance of this offset will be discussed in further detail below. As also shown in FIG. 4A, the perimeter area (210) has an inner edge (212) offset further from the boundary (120). In the example of FIG. 4A, each of the outer edge (211) and the inner edge (212) is offset from the boundary by a respective, substantially constant amount over its whole length. However, it is envisaged that the perimeter area (210) might follow the path of the boundary in a less regular manner.

In the perimeter coverage mode the robot may use the stored data defining the boundary (120) to navigate. For example, the perimeter area (210) may be defined within the robot's programming such that it remains at least a distance $d_{p1}$ from the boundary (120), corresponding to the outer edge (211) of the perimeter area (210). In addition, or otherwise, the perimeter area (210) may be defined within the robot's programming such that it remains within a distance $d_{p2}$ from the boundary (120), corresponding to the inner edge (212) of the perimeter area (210).

However, the robot might also navigate by directly detecting the boundary (120). For instance, one of the robot's positioning systems may use sensors that directly sense the robot's current distance from the boundary. Examples of such positioning systems include systems able to discriminate between grass and non-grass and therefore identify the edge of a lawn (such as those proposed in EP1992211 and EP2281428, for instance) as well as range-finder systems (for example using laser, radio or ultrasound sensors) that may detect a sudden change in distance to nearby features and therefore identify the edge of the working area. These may be considered as examples of sensors that can detect a natural (in the sense that it is and not part of the robotic system) or pre-existing boundary of a working area. Still other examples will be apparent to those skilled in the art.

Where the robot is able to navigate by directly detecting the boundary (120), it may not need to use stored boundary data to navigate. In addition, or instead, where one of the robot's positioning systems includes sensors that directly sense the robot's current distance from the boundary, the robot may, during the perimeter coverage mode, generate data defining the boundary of the working area within the garden and store this data within the data storage. Further, the robot may periodically, or continually, update the data defining the boundary of the working area using the information regarding its distance to the boundary provided by this positioning system.

In the perimeter coverage mode, the robot may follow one or more paths upon each of which the robot is a respective, substantially constant distance from the boundary of the working area. The first such path might be adjacent the boundary, with subsequent paths being spaced from the boundary by successively greater amounts (for example, there could be a fixed increment in the distance that the robot is from the boundary from one path to the next); thus, each of the paths might be nested within another.

Figure 4B:
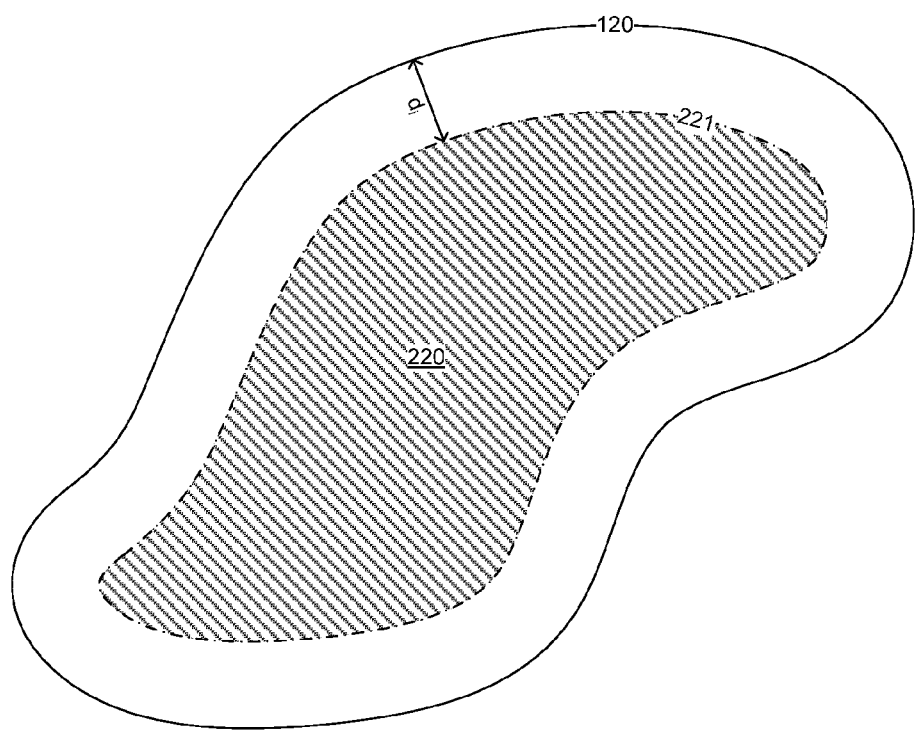

Turning now to the internal area coverage mode, in this mode the robot, using its positioning systems and the stored data defining the boundary (120) of the working area, moves within an interior area (220) with its payload active. This interior area (220) is defined within the robot's programming such that it is generally located within the perimeter area (210). An example of this is shown in FIG. 4B, which illustrates such an internal area (220), but does not show the corresponding perimeter area (210). As may be seen from FIG. 4B, the internal area (220) has an outer edge (221) that is offset from the boundary (120) of the working area. For example, in the internal area coverage mode, the internal area (220) may be defined within the robot's programming such that the robot remains at least a distance di from the boundary (120), corresponding to the outer edge (211) of the perimeter area (210).

In the internal area coverage mode, the robot moves within an interior area of the working area. Typically (though not necessarily) in this mode the robot will attempt to cover the remainder of the working area. Thus, the robot will continue in this internal area coverage mode until there is a high probability that the entire working area has been covered by the payload.

For the reasons discussed above, it is possible to tolerate the fact that the accuracy of the robot's positioning systems is greater during the perimeter coverage mode than during the internal area coverage mode. This difference in accuracy may be due in part to the scanning pattern utilised during the internal area coverage mode. In one example, during the internal area coverage mode the robot may cover a much greater distance, as compared with the perimeter following mode, before returning to a known location (such as a charging station), which provides a much greater opportunity for relative motion sensors to suffer from drift. In another example, the positioning system might be a partially vision based system and the boundary might be trained as a reference trail using some of the approaches described in the section above—the data defining the boundary might be feature description data for points on the reference trail along (or adjacent to) the boundary). With such reference trail systems and vision-based systems, the environment may be more recognisable to the robot when it is near to the boundary and/or while it is following paths that are parallel to the boundary. In examples where one of the robot's positioning systems uses sensors that directly sense the robot's current distance from the boundary, the accuracy with which such a positioning system can estimate the robot's current distance from the boundary will generally decrease with increasing distance from the boundary. Thus, the overall accuracy of the robot's positioning systems will tend to also decrease with increasing distance from the boundary.

In view of this, the perimeter area (210) and the internal area (220) may be defined within the robot's programming in dependence upon the accuracy of the robot's positioning systems during each of these modes.

It will be appreciated that the robot's payload may have a footprint upon which it acts. This footprint may be characterised by a width M to a reasonable level of approximation. Thus, if the robot is at a certain position, its footprint extends a distance M/2 either side of this position. Accordingly, if the robot's positioning system were perfectly accurate, it might be desired to set the value of distance $d_{p1}$ to be M/2, so that the edge of the payload touches the boundary (120), thus ensuring that the payload is applied right to the edge of the working area.

However, in practice, there will be some error in the robot's positioning systems in the perimeter coverage mode. This may, for example, be characterized by a value $E_p$.

So as to reduce the risk that the robot's payload is applied beyond the boundary (120) during perimeter coverage mode, it may therefore be desired to set the value of distance $d_{p1}$ such that $d_{p1}=M/2+E_p$.

Similarly, in the internal area coverage mode, there will be some error in the robot's positioning systems. This may, for example, be characterized by a value $E_i$. It is similarly desired to reduce the risk that, during the internal area coverage mode, the robot's payload is applied beyond the boundary (120). Accordingly, it may therefore be desired to set the value of distance $d_i$ such that $d_i \geq M/2+E_i$.

More generally, the interior area (220) may be defined within the robot's programming to be sufficiently distant from the boundary (120) of the working area to substantially avoid the robot in practice moving beyond the boundary (120) during the internal area coverage mode, taking into account the accuracy of the robot's positioning systems during the internal area coverage mode.

If $d_i=M/2+E_i$ (the minimal value of $d_i$), then the overlap between the area covered by the payload in the two modes may be substantial, which may not be efficient, since the robot will spend more time than necessary applying its payload to the same portion of the working area.

On the other hand, if $d_i$ is made too large, gaps may appear between the area covered by the payload during the internal area coverage mode and the area covered by the payload during the perimeter coverage mode.

To reduce the risk of such gaps, the values of $d_{p2}$ and $d_i$ may be chosen such that, the edge of the area addressed by the payload in one mode will coincide with the edge of the area addressed by the payload in the other mode, even where the maximum error is encountered. In this maximum error arrangement, the edge of the robot's payload in the internal area coverage mode will extend beyond the outer edge (221) of the internal area (220) by an amount $M/2+E_i M$. Similarly, the edge of the robot's payload in the perimeter coverage mode will extend beyond the inner edge (212) of the perimeter area (210) by an amount $M/2+E_p$. Thus, $d_{p2}$ and $d_i$ may satisfy the relation $d_i-d_{p2} \leq M-E_p-E_i$. It will be noted that, where $M \geq E_p+E_i$. (i.e. the payload width is large than the sum of the positioning system errors), the value of $d_i-d_{p2}$ is positive and thus, there is in fact a gap between the internal area (220) and the perimeter area (210) as defined in the robot's programming, although in practice the area covered by the payload during the two modes may nonetheless be expected to overlap. Put differently, while the internal area (220) does not overlap with the perimeter area (210), it approaches it sufficiently to substantially avoid gaps between the area that is in practice covered by the payload during the internal area coverage mode, taking into account the accuracy of the positioning systems during the internal area coverage mode, and the area that is in practice covered by the payload during the perimeter coverage mode, taking into account the accuracy of the positioning systems during the perimeter coverage mode.

Conversely, with smaller payloads, or with larger positioning errors, it may be desired that the internal area (220) and the perimeter area (210) do in fact overlap.

Figure 4C:
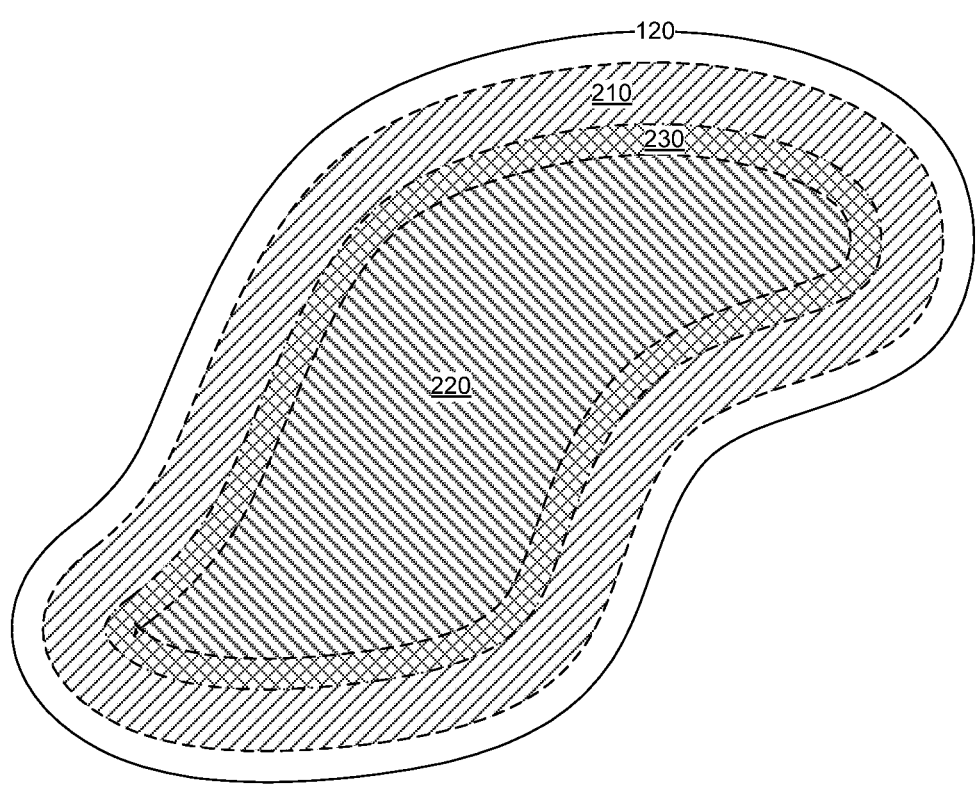

More broadly, it may be desirable to provide some overlap of the areas so as to further ensure that no gaps in coverage appear. Thus, in the example of FIGS. 4A-4C, the internal area (220) overlaps with the perimeter area (210), as may be seen most clearly in FIG. 4C.

The scanning pattern followed by the robot may differ between the two modes. For instance, in the perimeter coverage mode, the robot may follow one or more paths upon each of which the robot is a respective, substantially constant distance from the boundary (120). Such a strategy may allow the robot to efficiently cover the perimeter area, since it may be a relatively narrow strip of area.

Figure 5:
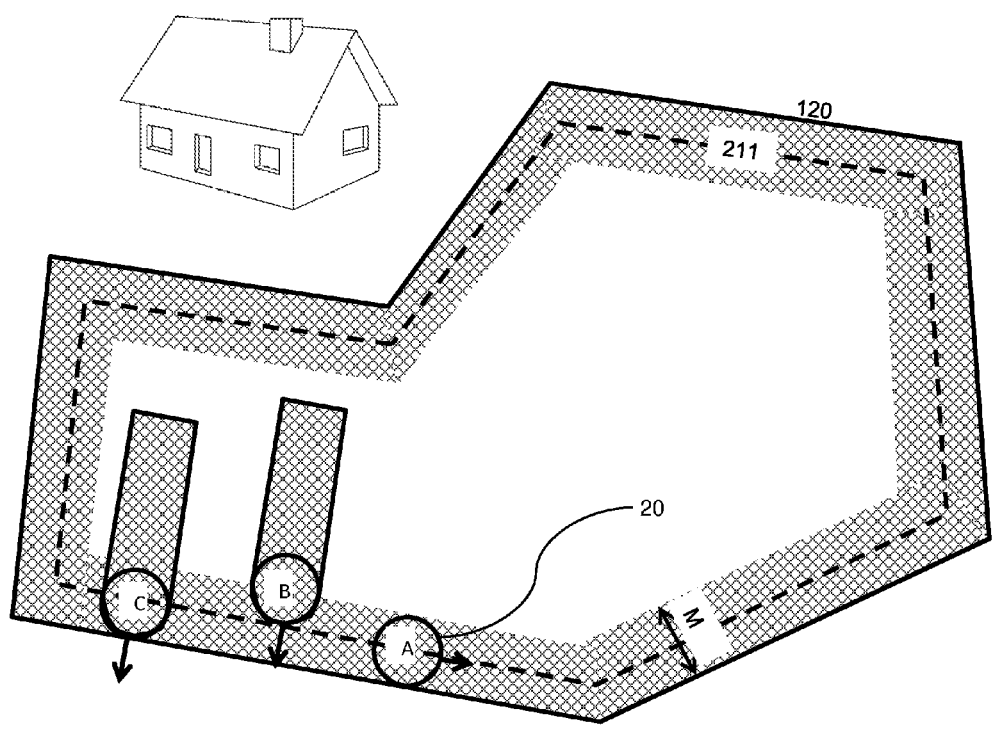
FIG. 5 illustrates examples of scanning patterns that may be used in the system of FIGS. 4A-4C.

Such an arrangement is shown in FIG. 5, where a robot 20, in position A, is carrying out a circuit of the working area, proceeding along a path (211), which is the outer edge of the perimeter area. As shown in the drawing, the robot's payload covers a width M during this circuit. While in the perimeter coverage mode the robot moves generally parallel to the path of the boundary (120), in the area coverage mode the robot moves generally perpendicular to the path of the boundary (120), for example in positions B and C. In addition, it will be noted that the robot is covering substantially parallel strips in the internal area coverage mode.

More broadly, in the internal area coverage mode, various strategies of area coverage might be employed, such as random (where the robot needs only to detect when it reaches the area boundary and may then retract from it, for example at a random angle) and systematic coverage (where the robot determines its position using the positioning system and plans its path accordingly) and various paths of movement used for the actual scanning such as straight lines (either parallel or with varying directions), spirals and the like. Combinations of such strategies may also be employed, for example combining local systematic coverage with random movement between those locally covered areas.

In one example, the robot may cross the internal area (220) a large number of times, for instance travelling along a generally straight-line path for each such crossing. After completing each crossing of the internal area, the robot may then execute a turn as it approaches the edge of the internal area (221) and thereafter carry out a further crossing of the internal area. The robot may, for example, depart from the boundary at a randomly derived angle, or at an angle calculated based on the angle at which it approaches the boundary.

Where a charging station is provided as part of the system, the robot may return to the charging station after carrying out a predetermined number of circuits in the perimeter-coverage mode or after travelling over a predetermined distance in the internal area coverage mode, thus re-calibrating its positioning system. In some cases, the robot could return to the charging station after each circuit.

3. Boundary Over-Ride

The present section concerns domestic robotic systems that, as with those discussed above in the "separate perimeter and area coverage" may operate within a working area defined by a "virtual" boundary. Such systems may therefore include data storage operable to store data defining the boundary of a working area. More particularly, the systems described in this section utilise robots that include (at least) two positioning systems: a first and a second positioning system.

The first of these positioning systems may utilise a wide variety of sensors, such as relative motion sensors (it could, for example, be an inertial positioning system), local positioning system sensors, or satellite navigation system sensors (such as a GPS receiver). The second of the positioning systems uses sensors that directly sense the robot's current distance from the boundary. Examples of such positioning systems include systems able to discriminate between grass and non-grass and therefore identify the edge of a lawn (such as those proposed in EP1992211 and EP2281428, for instance) as well as range-finder systems (for example using laser, radio or ultrasound sensors) that may detect a sudden change in distance to nearby features and therefore identify the edge of the working area. These may be considered as examples of sensors that can detect a natural (in the sense that it is and not part of the robotic system) or pre-existing boundary of a working area. Still other examples will be apparent to those skilled in the art.

The Applicant envisages that a robot (such as that described above with reference to FIG. 1) with such positioning systems may be programmed to operate in (at least) the following two modes: an area coverage mode and a boundary proximity mode. Typically the payload of the robot will be active during both of these modes, so that they each contribute to coverage of the working area.

To describe more fully these modes, during the area coverage mode, the robot generally navigates within the working area by using the first positioning system and the stored data defining the boundary. In one example, the first positioning system might include a GPS receiver, with the robot keeping within the boundary, which is defined in terms of coordinate data, by comparing its current position according to the GPS positioning system with the coordinates of the boundary. In another example, the first positioning system might be an inertial positioning system.

The robot is programmed to switch from this area coverage mode to the boundary proximity mode when the second positioning system (with the aid of the sensors operable to sense directly the boundary of the working area and the robot's current distance thereto) identifies or detects the boundary with a sufficiently high confidence level. In this boundary proximity mode, the robot navigates generally using the second positioning system.

It may be noted that, especially where the boundary is a pre-existing feature of the environment (not being part of the robotic system) there is the potential for uncertainty over the identification of the boundary by the second positioning system. Therefore, any potential identification of the boundary may have associated with it a confidence level. This may be compared with a pre-determined value programmed into the robot (such as 70%, 80% etc.) and if the confidence of identification is greater, the switch to the boundary proximity mode occurs.

It should be noted, however, the switch to the boundary proximity mode may have further conditions attached to it. For example, it may be contingent upon the first positioning system indicating, based on the stored boundary data, that the robot is within a pre-determined distance of the boundary. This might address possible "false positive" issues: essentially, the robot may ignore the position determination from the second positioning system unless the first positioning system indicates that the robot is within a pre-determined system from the boundary. Further, the switch might be contingent upon the first positioning system indicating that the robot is approaching the boundary. Again, this may address "false positive" issues: essentially the robot may trust the determination of the orientation of the robot with respect to the boundary from the first positioning system more than that from the second positioning system.

Since the robot, during the boundary proximity mode, trusts the information from the second positioning system more than the information from the first positioning system, the robot may update its stored boundary data with the more trusted information from the second positioning system while it is in the boundary proximity mode. Thus, a conservative estimate of the boundary's position may initially be programmed into the robot, with the robot progressively "learning" where the actual boundary's position is.

The switch back to the area coverage mode may then occur when the robot is a predetermined distance from the boundary, determined using the first positioning system with the updated boundary data. Of course, the determination could be carried out by the second positioning system instead.

It should be appreciated that the boundary data may be programmed into the robot by using approaches described above in the "navigation using a reference trail" section. In one example, the robot could be provided with a camera and "taught" the boundary as a reference trail, with the robot using feature detection and description processes to analyze the information from the camera. Thus, the boundary data might include the feature description information.

Optionally, the sensors operable to sense directly the boundary of the working area and the robot's current distance thereto might be provided by the same camera (though two separate cameras could of course be utilized, with the camera used in conjunction with the second system more sensitive to green light in the case of a robotic lawnmower, so as to better identify grass). This may be seen as an example of sensors being shared between the two positioning systems. In such cases, the two positioning systems may be distinguished by the processes by which the sensor data is analyzed.

Further, it will be appreciated that a positioning system may combine different types of sensors. For instance, in the example given immediately above, the robot's first positioning system might also include a GPS receiver, so that the stored data defining the boundary includes both feature description information (derived from the camera) and location information (derived from the GPS receiver).

4. Navigation Using a "Skeleton" Reference Trail

The present section describes domestic robotic systems and methods where a robot, (for example as described above with reference to FIG. 1) navigates in a similar fashion to that described in the "Navigation using a reference trail" section above, using sensor data to determine its current position relative to a reference trail that the system has been "trained" or "taught". However, in contrast to the systems described above in the "Navigation using a reference trail" section, where the path of the reference trail is defined by the user, the systems described in this section use a reference trail whose path is calculated by the system. Further, while in a number of the foregoing examples the reference trail, once defined by the user, is used as the boundary of an area within which the robot is permitted to move, examples in this section use a reference trial whose path is calculated so as to be spaced apart from a boundary with a predetermined path.

Similarly to the systems described in the "Navigation using a reference trail" section above, as the robot moves along the reference trail in the reference trail recording mode, the system stores reference trail information corresponding to each of a number of points along the reference trail, with this reference trail information being derived from the sensor information received at the points.

However, unlike in some of the examples above where the robot is under the user's direct control while travelling along the reference trail, as the reference trail used here is calculated by the system, it is necessary for the robot to navigate by itself along this calculated reference trail. This may be accomplished using the robot's on-board sensors.

For example, the robot might navigate using sensors operable to sense the relative motion of the robot, such as odometers, accelerometers, gyroscopes and magnetometers. These could, for example, form part of an inertial measurement unit provided on-board the robot.

The robot might also navigate using local environment sensors provided by the robot, such as a camera, or a receiver for a local positioning system. For instance, where a camera is used, the robot may navigate using visual odometry. Analogous odometry techniques may be used where the robot is provided with an array of local environment sensors that do detect different parts of the EM spectrum, such as microwave, radio wave, IR, UV and the like. In another example, the robot might navigate by using sensors operable to receive signals from exterior the robot and by determining its current position based on the time-of-flight for such signals from exterior the robot. In such examples, the robot might make use of a satellite navigation system receiver and/or a local positioning system receiver.

In still other examples, the robot may utilise a combination of such approaches. This may be beneficial in terms of improving the accuracy and redundancy of navigation. Accordingly, the system may make use of a sensor fusion algorithm, such as a Kalman filter, to fuse together estimates of the robot's position based on information from different sensor units (48).

As noted briefly above, the path of the reference trail is calculated so as to be spaced apart from the boundary. This may be helpful in increasing the likelihood of the robot remaining within the boundary, even if errors occur while navigating along the reference trail. Indeed, the path of the reference trail may be calculated so as to take account of the errors the robot is likely to experience while travelling along the reference trail. Thus, where the navigation error increases with increasing distance along the reference trail (for example owing to integration drift, as may be experienced with an IMU), the path of the reference trail may be calculated so that the spacing from the boundary increases with increasing distance from the start-point of the reference trail. Thus, the path of the reference trail may be calculated so as to be spaced apart from the path of the boundary by at least the accuracy of navigation when travelling on the reference trail.

The reference trail calculated by the system may be a "skeleton", in the sense that it is a simplified path consisting of a relatively small number of straight-line segments (for example no more than 20, more preferably no more than 10, still more preferably no more than 5 straight line segments). Such a simplified path may assist in reducing navigation errors when the robot "records" the reference trail, since fewer turns are carried out by the robot.

A further reason for calculating the reference trail such that it is spaced apart from the boundary is that there is a greater likelihood that, during later navigation, the robot will find itself in a position at, or adjacent to such a reference trail. This may, in turn, improve the accuracy with which the robot may determine its position, since the current sensor information may be more easily compared with the stored reference trail information. Indeed, the robot may be programmed so that, such later navigation, it deliberately follows a path intended to cross the reference trail a number of times. At each of these crossing points, there is a good change of a high quality match between the current sensor information and the reference trail information and thus an accurate estimate of the robot's current position. Accordingly, the robot may be thought of as "pinning" its position at each of these crossing points.

The robot may be provided with a number of local environment sensors that are configured to receive signals from exterior sources local to the robot. Such local environment sensors may include a number of arrays of like sensors, with each array having an associated field-of-view. For example, in the case of visible light sensors, one or more cameras might be provided on-board the robot.

When the robot is operating in a navigation mode, the use of data from such local environment sensors may differ depending on whether the robot is near to, or distant from, the reference trail. For instance, when the robot is at or adjacent the reference trail it may navigate in dependence on an estimate of its current position determined using data from the local environment sensors. Specifically, it may compare current sensor information from the local environment sensors with said reference trail information. The approaches discussed above in the "Navigation using comparison of data" section may be utilised in such cases. By contrast, when the robot is distant from the reference trail it may navigate in dependence on an estimate of its current position determined using data from sensors other than the local environment sensors (such as the aforementioned GPS and/or IMU sensors). As mentioned above, a sensor fusion algorithm, such as a Kalman filter, may be used to fuse such estimates of the robot's position, thus ensuring that the robot's position is known with a good accuracy.

As also mentioned above, in the navigation mode, the robot may be programmed so as to navigate along a path such that it crosses the path of said reference trail a plurality of times, thus allowing the "pinning" of the robot's position using the reference trail data. More particularly, the robot may be programmed so as to navigate along a path such that the field of view of one of the sensor arrays at each crossing point overlaps with at least 50% of the field of view of one of the sensor arrays at the same point during the reference trail recording mode. This may assist in ensuring a high quality match between the current sensor data (specifically from the local environment sensors) and the sensor data stored during the reference trail recording mode.

The robot may be programmed to recognise certain kinds of markers, which may be placed within or adjacent the working area so as to aid navigation. A variety of markers may be utilised for this purpose, such as visual markers (for instance with specific patterns that the robot is programmed to recognise), or beacons that emit radio waves or infra-red. Such markers may be placed near the start of the reference trail and, indeed, may be used to mark or designate the start of the reference trail. However, it is also possible for such markers to aid in navigation in the vicinity of the start of the reference trail without actually designating the exact location of the start of the reference trail path. For instance, such markers may be placed on a base station (such as a charging station), so that they assist the robot in navigating to the base station, but the mechanical engagement of the robot with the base station itself may define the precise start of the reference trail path.

In the case where the start of the reference trail path is defined by mechanical engagement between the robot and docking station it is of course envisaged that the end point of the reference trail will similarly be defined by mechanical engagement between the robot and docking station. This should be understood as one example of a situation where the path of the reference trail begins and ends at the same point. In another example, the start and end of the path of the reference trail may be designated using a number of markers. Especially in such situations, it is envisaged that the system may calibrate the reference trail information based on the assumption that the robot starts and ends at the same location. Thus, the approaches discussed above in the "Navigation using post-processed information" may be utilised so as ensure the reference trail data is of high quality based on this assumption.

It will though be understood that the path of the reference trail need not have the same start and end. In such a case, markers might be placed in the vicinity of both the start and end of the path of the reference trail.

While it has been stated above that the system in general calculates the path of the reference trail, in certain embodiments the path may be calculated by the robot itself, for example using one or more of processors 41 of the control system 40. Of course, some other component, such as a base station, might instead calculate this path.

5. Example 1

In the following example of a domestic robotic system there is described a robot that navigates using a reference trail (as described in the "Navigation using a reference trail" section above), recording a trajectory and later evaluating the robot's relative position in relation to that initial trajectory.

As discussed above, such information concerning the robot's relative position can be used by the robot control system in order to drive at the exact trial recorded. Moreover, as discussed in the "Iterative reference trails" section above, such a capability may allow the robot to drive at adjacent trajectories. If these trajectories are than trained to be reference trajectories, they can be a referenced for additional adjacent trajectories and thus an entire area can be efficiently covered, using only perimeter trajectory training.

Nevertheless, even if only the perimeter trajectory of the work area is reconstructed precisely, without additional adjacent trajectories, the entire area can yet be covered by other navigation systems, that do not need to be as accurate. An example of this is shown in FIG. 6, where a robot has been taught a reference trail (110) that is offset from the boundary 120 by a distance approximately equal to half the width of the footprint of the robot's payload.

For example, if the robot payload acts on an area 0.5 m wide (the cutting width, in the case of a robotic lawnmower) then by defining the other navigation system a boundary at 0.25 m inwards to the reference perimeter trajectory, it is sufficient for the other navigation system to be with accuracy of +/−0.25 m.

Figure 6:
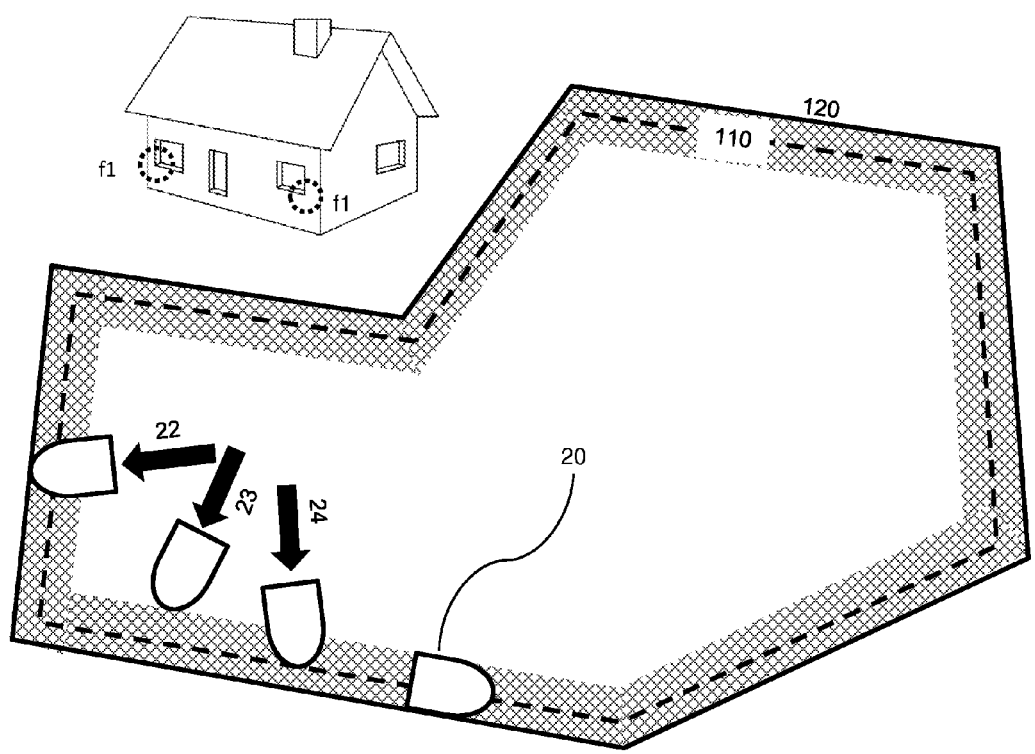
FIG. 6 illustrates an example of a domestic robotic system that navigates relative to a reference trail within the working area that the robot has been taught.

Following an approach discussed above in the "separate perimeter and area coverage", such an accuracy will allow the robot not to exceed the reference perimeter on one hand (as illustrated in FIG. 6 by the robot (20) moving along paths 22, 23, 24 and stopping before the boundary (120)), and to maintain an overlap with the 0.5 m wide worked area covered during the reference perimeter trajectory reconstruction (as discussed with reference to FIGS. 4 and 5 above).

It should be noted that some parts of the reference trail may not contain enough visual information for the later position reconstruction (momentary visual field obstruction, areas without visual points of interest that the system can refer to etc.). Therefore, a combination of such a vision-based positioning system with another positioning system may be appropriate in some circumstances. For example, a combination of a gyro and odometer can perform a good short-range positioning system (a method known as "dead-reckoning") which can be used on such segments, until the robot is again able to determine its position using the vision-based positioning system. Such a combination can also be used to reduce the rate of the pictures taken, thus allowing reduced real-time computational power, which may reduce the system cost.

This approach is very different from various known positioning methods. Such methods, like GPS and other beacons-based system, optical markers triangulations, landmarks tracking systems and such are all seeking for the 2D (X,Y) or 3D (X,Y,Z) position of the mobile robot. By contrast, the vision-based positioning system described here locates the robot only in relation to the reference trail (e.g. to the closet point on the reference trail).

The use of the domestic robotic system according to this example is hereby described:

1. Training

The robot is walked through the desired reference trail and images are stored at the desired rate, which is for example derived from the robot velocity and required trail-following accuracy. For example if the robot speed is 0.5 m/sec and desired accuracy is 5 cm, the image grabbing rate shall be >=10 frames per second). During this training the additional positioning systems, if present, are also operating and recording data so it can be later all combined to provide an accurate reference.

2. Trained (Reference) Trail Processing

Each of the images is processed and data identifying points of interest within the image is stored in a database. This data is the information upon which images from the run trail will be later compared and matched. There are various methods and algorithms in computer vision which allow such matching. Typical algorithms extract features from the images, such as corners or other high contrast/geometrically-interesting points, and process them to obtain a set of descriptors which will be invariant to some parallax, angular and scale differences (as discussed above, examples for such algorithms, amongst others, are SIFT and SURF).

The points of interest can be also used to match between adjacent images. Such a matching allows reconstructing the relative position of the camera in the various images, so that the trajectory of the robot can be registered. This can be also done by other navigation systems and/or by combining several systems.

The registered reference trail allows better position estimation at the run trail as well as to navigate between the points where image matching is available.

3. Run Trail—Best Match Image

The robot can now be sent to follow the reference recorded trail. For each image taken during the run-trail, the points of interest and descriptors (mentioned at #2 above) are calculated. Then, a search is performed, to find which of the images in the reference trail present the best match, given the images are not taken at the very same location and angle. This can be done by scoring features matching between the images and selecting the highest scored image. The scoring can be based on various inter-frame properties such as the overlap, scaling and rotation between the images.

4. Run Trail—Distance Estimation

Once the best-matched reference image has been found, the distance between the point the reference trail image was taken and the current position, can be calculated. This is can be done in several ways. For example, the distance to the selected features in the image can be estimated using multi-frame stereoscopic analysis and the information of the distance the robot passed between the images and their angular difference (this is usually available from the robot odometer, or from other sensors such as accelerometers, gyros or GPS).

Knowing the distance to the features, the camera position of the tested image in relation to the reference image can be calculated, using the angular shift between the images and/or the scale change.

5. Run Trail Control Command

Using the calculated distance between the current camera position and the closest reference trail camera position, the robot control system can command its drive system to correct the position in order to follow the reference trail, or to follow a parallel trail at a desired offset.

Figure 7:
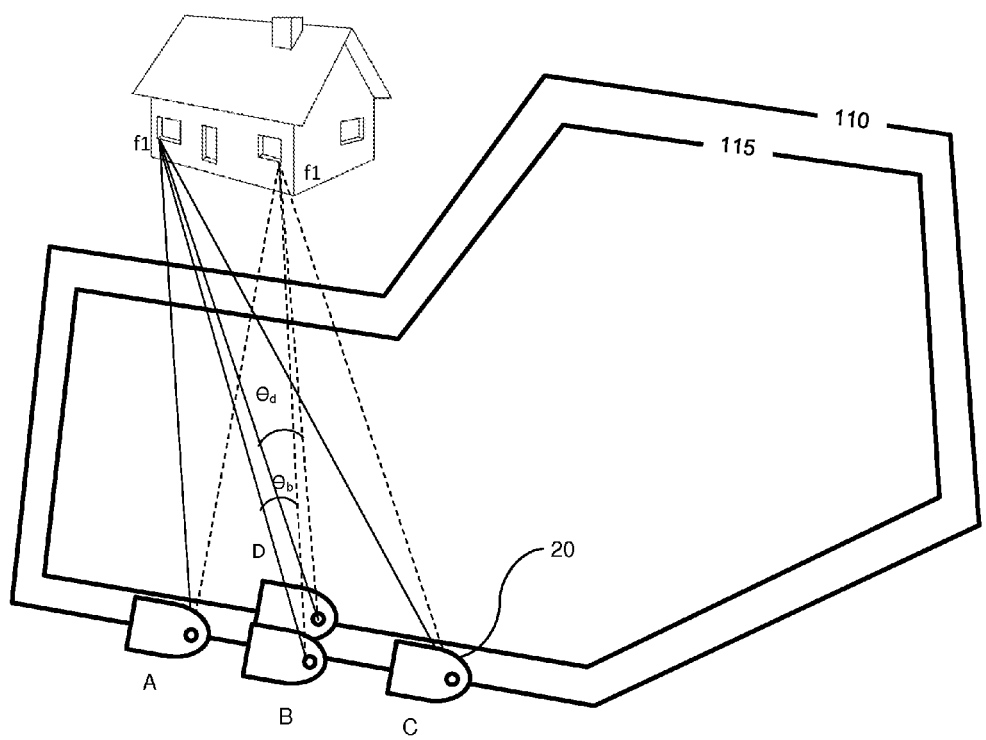
FIG. 7 shows further details of the domestic robotic system illustrated in FIG. 6.

Further details of this example of a domestic robotic system are shown in FIG. 7, which shows the robot in 3 positions, A, B and C on the reference trail (110) and at position D on the run trail (115). Two sample features (f1,f2), at the corners of the house windows, are shown for position A, B and D. Knowing the distance between point A and B and the angular difference (these can be derived, for example, by sensors such as odometers, gyros, compass or GPS, but can also be extracted from robot-camera images facing along the robot direction of movement, or pointing down like optical mouse), the distance to the features f1 and f2 can be calculated, or rather to a certain point on the plane containing f1, f2.

Figure 8:
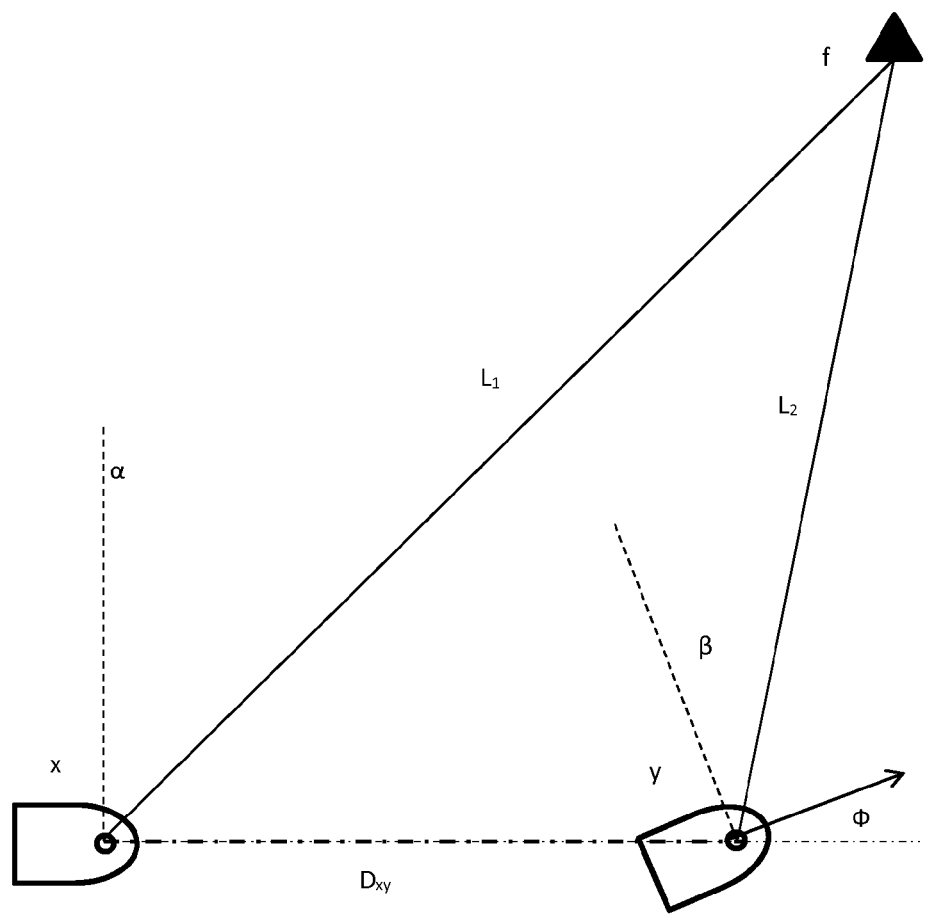
FIG. 8 illustrates the calculation of distances to features that may be utilised in the system shown in FIGS. 6 and 7.

This is explained further with reference to FIG. 8. Assuming $L_1$ and $L_2$ (the distance between the robot and feature f) are much greater than $D_{xy}$ (the distance between robot position X and Y) than their average L can be estimated as $L=D_{xy}/(\alpha-\beta+\phi)$ where the angles $\alpha$ and $\beta$ are the angles the feature f is seen in relation to the camera optical axis and $\phi$ is the angle difference between the robot position at point X and Y (all angles in radians). On the run trail, when the robot takes the image at position D, it also identify f1 and f2 features and accordingly finds that the best image match from the reference trail is the image taken in position D (this will most likely be the point where the relation between f1, f2 and other features identified, will be similar in the run image and reference image D). From the angular difference between f1 and f2 in the reference image C in relation to the run image D (which can be measured by the distance between f1 and f2 in the respective images) the magnification factor between the images can be calculated ($m=\theta_d/\theta_b$). Assuming the average distance to features f1, f2 (d) or the distance to a certain point on the plane connecting them, is similar at points A, B, C and D, the normal distance X between points D and B can be calculated as $X=d*(m-1)$ (if point D is closer to f1 and f2 than point B, m>1 and X>0. If point D would have been more distant to f1 and f2 then point B, m<1 and X<0 indicating the offset is out-wise from point B).

While this specific example involved the use of a vision system, the system could also be implemented using other local environment sensors. It may be beneficial that the sensors readings are unique in their vicinity on the reference trail and/or substantially repeatable (so if placed in the same position, the readings are always similar) and continuous (so that the sensing in a position close to the point where the reference readings were taken is close to that readings). Examples can be a radar/sonar/range-finder which sense the distance to the environment surrounding the robot or to some active beacons at that area, 3D camera, magnetic or electric field detectors etc.

6. Example 2

In the following example of a domestic robotic system there is described a system that navigates using a "skeleton reference trail" (as described in the "Navigation using a skeleton reference trail" section above). This "skeleton reference trail" is recorded and, during later navigation, the robot evaluates its relative position in relation to the recorded skeleton reference trail.

Figure 9:
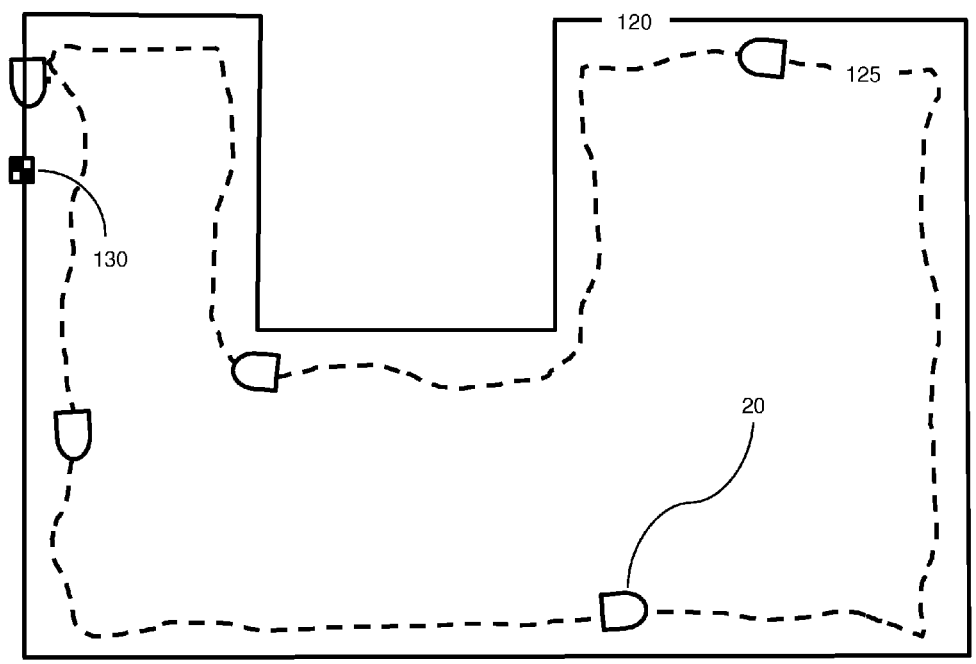
FIG. 9 illustrates an example of a domestic robotic system where the user defines a boundary path.
Figure 10:
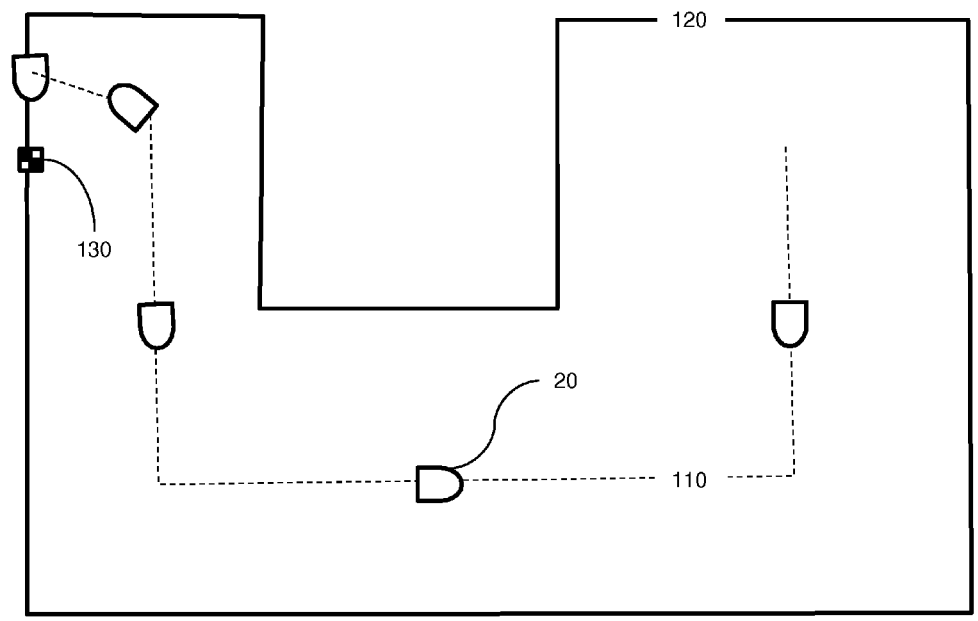
FIG. 10 illustrates a "skeleton" reference trail, as calculated by the system of FIG. 9, being recorded by the robot.
Figure 11:
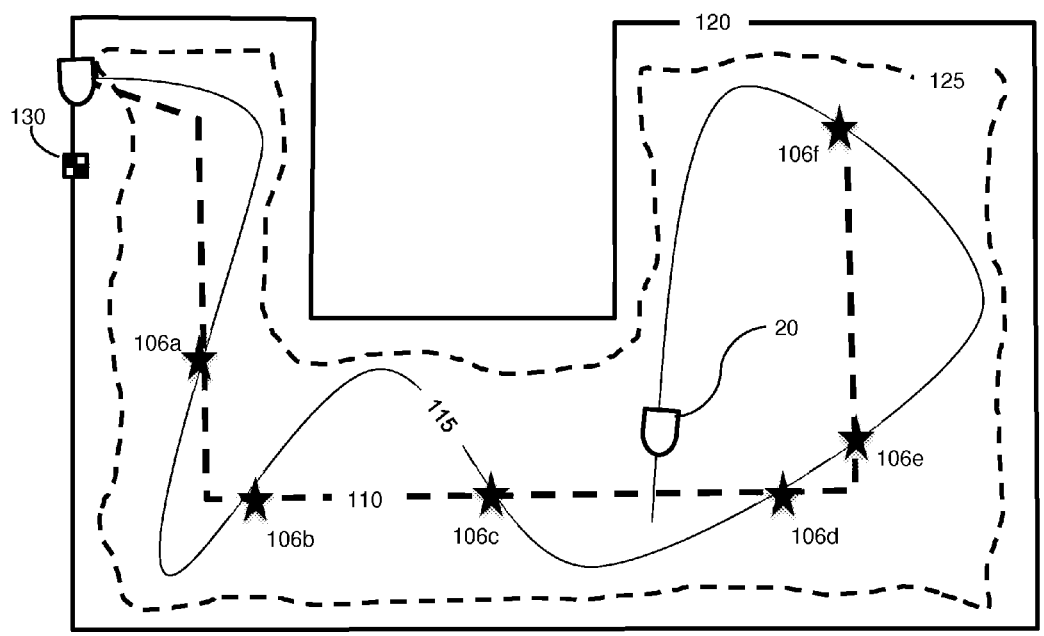
FIG. 11 shows the robot navigating using the "skeleton" reference trail shown in FIG. 10.

In more detail, in the example shown in FIGS. 9 to 11, the environment is used as a natural landmarks base, for navigation within a user-defined area (such as a lawn, in the case of a robotic lawnmower), thus requiring a very minimal setup. The robot shown in FIGS. 9 to 11 includes both local environment sensors (thus enabling the robot to detect such natural landmarks) and other, additional sensors. In the illustrated robot, these local environment sensors are provided by a forward-facing camera and a side-facing camera.

The robot includes a basic positioning system, capable of providing a reasonable relative accuracy for a short period (for example, a dead-reckoning using gyro and odometer or a visual odometry or ego-motion system, a GPS etc.). The use of a "skeleton reference trail" may assist in maintaining this accuracy, or indeed improving on this accuracy, when the entire operation is considered.

The use of the system shown FIGS. 9 to 11 may include the following stages:

1. Setting an origin point (both location and heading). This can be, for example, a robot base station where it is mechanically aligned in position and angle precisely, or a local reference point that the robot can calculate its relative position to, such as a marker (for instance, as described in GB 2 513 912 A) might be used, or a set of range finders using triangulation or trilateration and the like. FIG. 7 shows a checker-board patterned visual marker (130), which acts as the origin point.

2. Designated area definition: using the origin point, the boundaries of the designated area shall be defined. It is envisaged that approaches discussed above in the "Training of the reference trail" may be employed here. For instance, the area boundary may be defined by the user traveling with a tool or the robot itself, to record the trail defining the boundaries (using dead reckoning, GPS etc.) or by applying relative coordinates from the origin, using maps, google earth and the like. FIG. 9 illustrates the robot being guided along a user-defined boundary path (125), which is a rough approximation of the true boundary of the area to be covered by the robot (120) (e.g. the actual edge of the lawn, in the case of a robotic lawnmower).

If localization methods are used to define the area, they should start and end in proximity to the origin. Thus, the robot can calculate its relative position to the origin, at the start and the end, and adjust the recorded trajectory so that the calculated end-point matches its actual relative position from the origin.

3. Calculating a skeleton path (110): using the designated area definition (125), a skeleton path is calculated. There are various ways to derive the skeleton (110), depending on the application; one approach is to basically define a "safe" path that will not exceed the defined boundaries (so will be away from the boundaries at least a distance equal to the maximum location error which can be develop along the path). This path should also be one that the robot will frequently be proximate to, throughout later navigation within the area. FIG. 10 illustrates an example of such a "skeleton" reference trail (110), which is composed of four segments. As may be seen, this example of a skeleton reference trail has a serpentine path that is generally equidistant from the sides of the user-defined area boundary (125).

4. The robot operates in a reference trail recording mode, in which it drives along the skeleton path (110), while recording the environment through the robot sensors (for example local environment sensors, such as cameras, as well as additional sensors, such as a GPS receiver) and tagging the location of each recording with the approximate location as derived by the robot's basic positioning system. As is apparent from FIG. 10, the robot travels out and back along the same path, starting and ending at the marker (130).

5. The robot operates in a navigation mode, in which it moves within the designated, using its basic positioning system, but whenever it is proximate to the skeleton path (110), it matches the local environment sensors' current information to the stored reference trail information recorded during the reference trail recording mode (stage #4). In the example shown in FIG. 11, the robot crosses the path of the skeleton reference trail (110) at a number of crossing points (106a-106f). If there is a match, the relative location between the current robot position and its position during the recording is calculated and since the recorded information has a location tag, the absolute position can be obtained. This location "pinning" can be performed frequently if the robot plans its trajectory so it crosses or drives proximate to the skeleton. Alternatively, the robot can intentionally get to the skeleton area, through its basic localization system, in case it is not confident in the accuracy of the basic localization system.

In still further detail, the system shown in FIGS. 9 to 11 includes a robot carrying two cameras: a front looking camera (along the robot forward direction) and side-looking camera (perpendicular to the robot's forward direction). As noted above, in the example of FIGS. 9 to 11, the skeleton reference trail (110) is such that the robot travels out and back along the same path. Thus, on the outward journey, the side-looking camera will capture the view to one side along the whole of the trail and, on the return journey, the side-looking camera will capture the view to the other side along the whole of the trail. Similarly, the front looking camera will capture the view along the path in one direction during the outward journey and will capture the view along the path in the opposite direction during the return journey.

Then, when operating in a navigation mode within the designated area (stage #5) both front and side cameras are compared to the to the recorded skeleton trail, so when the robot is proximate to the skeleton, either the side camera will yield a match (from either the outward or the return journey), if the robot is aligned approximately parallel to the skeleton trail or the front camera will yield a match (again, from either the outward or the return journey), if the robot is approximately perpendicular to the skeleton trail.

More quantitatively, assuming the horizontal field of view of the cameras is HFOV, and assuming we seek a field of view overlap of 50% in order to get a good matching, then using front and side cameras with such a reference trail will cover 4*HFOV out of the 360 deg poses the robot may be.

For example, if the HFOV is 90 deg, each camera will be able to cover +/−45 deg off the pose the image was recorded. So overall, for the front and side cameras matching against the side camera recording on both forward and return trails of the skeleton, we will have a matching opportunity at any orientation of the robot in proximity to the skeleton trail (4*90=360 deg).

The calculation of the relative location between the current image and the recorded image can be further improved by using depth cameras which can also provide the distance to each pixel or cluster in the image. However, this can be also obtained with a 2D camera, by means of stereoscopic calculations or Bundle Adjustment, using 2 or more poses of the side camera with a known distance between them (through the robot basic localization system).

While in the example shown in FIG. 11 the robot (20), when operating in a navigation mode, remains within the user-defined boundary (125), it is envisaged that the system may make use of approaches discussed above in the "Boundary over-ride" section above. For example, where the robot detects the actual boundary of the area (120) with a sufficiently high confidence level, it may switch from an area coverage mode to a boundary proximity mode, where the robot navigates using a secondary positioning system. Such a secondary positioning system may use sensors that directly sense the robot's current distance from the boundary. As discussed above, where a camera is used, this may be used both as part of a primary positioning system and as part of a secondary positioning system, with the same data from the camera being processed using different algorithms. Thus, the secondary positioning system in a robotic lawnmower might make use of an algorithm that can discriminate between grass and non-grass so as to identify the actual boundary of the area (120): the edge of the lawn. Further, as also discussed in the "Boundary over-ride" section above, the robot may update its stored boundary data with the more trusted information from the second positioning system while it is in the boundary proximity mode. Thus, the conservative estimate of the boundary's position, as programmed into the robot during stage #2, may be updated, with the robot progressively "learning" where the actual boundary's position is.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A domestic robotic system comprising:
a robot comprising: a payload configured for performing a task within a working area within which said robot moves to perform said task, said working area associated with a predetermined boundary;
a plurality of sensors, including: one or more local environment sensors that are configured to receive signals from external sources local to said robot;
data storage configured for storing data including boundary data which defines said predetermined boundary associated with said working area; and,
at least one processor in communication with the plurality of sensors and the data storage, the at least one processor of the robot programmed to calculate a reference trail using said boundary data, such that said reference trail is spaced apart from said predetermined boundary, and to operate in modes including:
(i) a reference trail data recording mode, wherein:
the robot moves along said reference trail, while the at least one processor receives sensor data from said plurality of sensors; and,
the at least one processor is programmed to obtain reference trail data from said sensor data; and
the at least one processor is programmed to cause the storing of said reference trail data in the data storage; and,
(ii) a navigation mode, wherein the robot moves within said working area, the at least one processor programmed to control navigation of the robot by:
receiving sensor data from said plurality of sensors; and,
when said robot is at a location that is proximate to said reference trail, comparing a portion of said sensor data associated with said location with said stored reference trail data in order to determine a current position of the robot.

2. The domestic robotic system according to claim 1, additionally comprising:
a base station; and,
wherein the at least one processor is additionally programmed such that, when in said reference trail data recording mode, and the robot is proximate to said base station, the at least one processor recognizes said base station based on data obtained from said local environment sensors, and the at least one processor to calculates a path to the base station based on data obtained from said local environment sensors.

3. The domestic robotic system according to claim 1, additionally comprising:

at least one marker configured for emitting location signals, and, the at least one processor is additionally programmed to recognize said location signals from said at least one marker, as detected by said local environment sensors.

4. The domestic robotic system according to claim 3, wherein said at least one marker includes a first marker that is proximate to a first end of said reference trail, and the at least one processor is additionally programmed such that: in said reference trail data recording mode, when the robot is proximate to the first end of said reference trail, the at least one processor controls navigation by the robot by estimating the position of the robot based on said location signals emitted from said first marker.

5. The domestic robotic system according to claim 3, additionally comprising:
a base station including at least one base station marker, said at least one marker comprising said at least one base station marker;
wherein the at least one processor is additionally programmed, such that: when in said reference trail data recording mode, when the robot is proximate to said base station, the at least one processor recognizes the base station using data obtained from said local environment sensors, and the at least one processor calculates a path to the base station based on data obtained from said local environment sensors; and,
wherein said local environment sensors include visible light sensors and said at least one base station marker includes a high-contrast pattern detectable by said visible light sensors.

6. The domestic robotic system according to claim 1, additionally comprising:
a base station;
wherein the at least one processor, in said reference trail data recording mode, when said robot is proximate to said base station, is additionally programmed to recognize the base station based on data obtained from said local environment sensors, and to calculate a path to the base station based on data obtained from said local environment sensors; and,
wherein said reference trail has a start point and an end point, which are substantially co-located and are proximate to said base station.

7. The domestic robotic system according to claim 6, wherein the at least one processor is additionally programmed such that said reference trail includes first portion, which extends from said start point to a mid-point, and a second portion, which extends form said mid-point to said end point, said first portion coextending along said second portion.

8. The domestic robotic system according to claim 7, wherein said start point corresponds to the robot being docked at said base station and wherein the at least one processor is additionally programmed to calibrate said reference trail data based on the assumption that the robot starts and ends at the same location of said reference trail.

9. The domestic robotic system according to claim 1, wherein said plurality of sensors additionally includes: one or more additional sensors; and, the at least one processor in said navigation mode, when the robot is distant from said reference trail, is additionally programmed to control navigation by the robot based on a first estimate of a current position of the robot, said first estimate being determined by the at least one processor using data obtained from said additional sensors.

10. The domestic robotic system according to claim 9, wherein the at least one processor is additionally programmed such that said reference trail is calculated so as to be spaced apart from said predetermined boundary by at least the accuracy of said first estimate of the current position of the robot.

11. The domestic robotic system according to claim 10, wherein the at least one processor is additionally programmed such that, in said navigation mode, when the robot is at a location that is proximate to said reference trail, a second estimate of the current position of the robot is determined by comparing sensor data that the at least one processor has just received from said local environment sensors, with said reference trail data, and the at least one processor is additionally programmed to determine a third estimate of the current position of the robot by applying a sensor fusion algorithm to said first estimate and said second estimate and to control navigation by the robot based on said third estimate.

12. The domestic robotic system according to claim 9, wherein, in said reference trail data recording mode, the at least one processor controls navigation by the robot along said reference trail by determining the current position of the robot using sensor information from said additional sensors.

13. The domestic robotic system according to claim 9, wherein said additional sensors comprise at least one of:
at least one sensor operable to sense the relative motion of the robot; and at least one sensor operable to receive signals from exterior to the robot, with the at least one processor being additionally programmed to determine the current position of the robot, at least in part, based on a time-of-flight for said signals from exterior to the robot or a relative strength of said signals from exterior to the robot.

14. The domestic robotic system according to claim 13, wherein said local environment sensors comprise at least one of:
an array of like sensors;
one or more scanning sensors; and,
at least one sensor operable to receive signals that are reflected by the environment in response to the action of one or more scanning transmitters, with the robot additionally comprising said one or more scanning transmitters.

15. The domestic robotic system according to claim 1, wherein said local environment sensors comprise: plural arrays of like sensors, each array having an associated field-of-view.

16. The domestic robotic system according to claim 15, wherein the robot additionally comprises:
a movement system operable to propel the robot in a forward direction along a straight line path or to steer to one side or the other, so as to propel the robot along an arcuate path; and,
one of said arrays of like sensors is arranged on said robot such that a field-of-view of said array of like sensors is directed substantially in said forward direction; and,
wherein, the at least one processor is additionally programmed so as to, when in said navigation mode, cause the robot to navigate along a path, which is calculated by the at least one processor such that: the robot crosses said reference trail at a plurality of crossing points; and such that, when the robot is at one of said crossing points, the field of view of one of said arrays of like sensors overlaps with at least 50% of the field of view of one of said arrays of like sensors as when the robot was at said one of said crossing points during the reference trail data recording mode.

17. The domestic robotic system according to claim 16, wherein the robot comprises one or more cameras, each of said cameras providing a respective one of said arrays of like sensors.

18. The domestic robotic system according to claim 1, wherein the at least one processor is additionally programmed so as to, when in said navigation mode cause the robot to navigate along a path, which is calculated by the at least one processor such that the robot crosses said reference trail path a at a plurality of crossing points.

19. The domestic robotic system according to claim 18, wherein the at least one processor is additionally programmed such that, at each of said crossing points, the robot crosses said reference trail path at an angle greater than 45° with respect to the reference trail.

20. The domestic robotic system according to claim 1, wherein the at least one processor is additionally programmed such that the said reference trail consists substantially of straight-line segments.

21. The domestic robotic system according to claim 6, wherein the at least one processor is additionally programmed to calibrate said reference trail data based on the assumption that said start point and said end point are exactly co-located.

22. The domestic robotic system according to claim 8, wherein the at least one processor is additionally programmed to calibrate said reference trail data based on the assumption that said start point and said end point are exactly co-located.

23. The domestic robotic system according to claim 1, wherein the at least one processor is additionally programmed such that said reference trail comprises less than 20 straight line segments.

24. The domestic robotic system of claim 1, wherein the at least one processor is additionally programmed; to cause the storage of the reference trail data as data corresponding to a first plurality of points along said reference trail in said data storage; and, to obtain said reference trail data from portions of said sensor data corresponding to said first plurality of points.

25. The domestic robotic system of claim 1, wherein said reference trail data comprises a plurality of portions of reference trail data, and the at least one processor is programmed to obtain each of said portions of reference trail data when in said reference trail data recording mode, with each of said portions of said reference trail data being based on a portion of said sensor data that corresponds to a respective one of a plurality of points on said reference trail.

* * * * *